US011561991B2

(12) United States Patent
Kurz

(10) Patent No.: US 11,561,991 B2
(45) Date of Patent: *Jan. 24, 2023

(54) SYSTEM AND METHOD USING SPECIALIZED COMPUTERS AND SOFTWARE FOR CREATING WINE AND MUSIC PAIRINGS

(71) Applicant: Raymond A. Kurz, Bethany Beach, DE (US)

(72) Inventor: Raymond A. Kurz, Bethany Beach, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/915,482

(22) Filed: Jun. 29, 2020

(65) Prior Publication Data
US 2020/0327119 A1     Oct. 15, 2020

Related U.S. Application Data

(63) Continuation of application No. 15/288,618, filed on Oct. 7, 2016, now Pat. No. 10,698,915, which is a continuation of application No. 14/042,381, filed on Sep. 30, 2013, now abandoned.

(60) Provisional application No. 61/707,588, filed on Sep. 28, 2012.

(51) Int. Cl.
*G06F 16/248* (2019.01)
*G06F 16/2453* (2019.01)
*G06F 16/24* (2019.01)

(52) U.S. Cl.
CPC ............ *G06F 16/248* (2019.01); *G06F 16/24* (2019.01); *G06F 16/2453* (2019.01)

(58) Field of Classification Search
CPC ..... G06F 16/248; G06F 16/2453; G06F 16/24
USPC ........................................................ 707/722
See application file for complete search history.

(56) References Cited

U.S. PATENT DOCUMENTS

| | | | |
|---|---|---|---|
| 7,003,515 B1* | 2/2006 | Glaser | G06F 16/683 707/723 |
| 9,262,743 B2* | 2/2016 | Heins | G06Q 10/10 |
| 2005/0040051 A1* | 2/2005 | Martin | G09B 19/00 206/215 |
| 2008/0133318 A1* | 6/2008 | Ramamurti | G06Q 30/0222 705/7.29 |
| 2009/0152340 A1* | 6/2009 | George | G06Q 30/02 235/375 |
| 2011/0196865 A1* | 8/2011 | Eggink | G11B 27/105 707/732 |
| 2011/0264657 A1* | 10/2011 | Hoffman | H04L 67/51 707/769 |
| 2012/0226698 A1* | 9/2012 | Silvestre | G06Q 30/02 707/E17.084 |
| 2012/0303470 A1* | 11/2012 | Arsenault | G06Q 10/00 705/15 |

(Continued)

*Primary Examiner* — James Trujillo
*Assistant Examiner* — Fariborz Khoshnoodi
(74) *Attorney, Agent, or Firm* — Hogan Lovells US LLP

(57) ABSTRACT

A system, method, specialized computers, and software for improving wine consumption experience is disclosed. In some configurations, descriptors for wine and or music may be determined. Wine and music profiles may be generated. Wine-music pairs may be created in certain configurations. In some configurations, a user may use certain configurations to select a particular wine, have his or her mobile device play a song matched to that wine.

12 Claims, 17 Drawing Sheets

(56) References Cited

U.S. PATENT DOCUMENTS

2013/0080438 A1* 3/2013 Tompkins ............. G06F 16/285
707/740
2013/0339348 A1* 12/2013 Pickelsimer ....... G06Q 30/0631
707/723

* cited by examiner

SYSTEM AND METHOD USING SPECIALIZED COMPUTERS AND SOFTWARE FOR CREATING WINE AND MUSIC PAIRINGS

CROSS REFERENCE TO RELATED APPLICATIONS

This application is a continuation of U.S. application Ser. No. 15/288,618 filed Oct. 7, 2016, which is a continuation of U.S. application Ser. No. 14/042,381 filed Sep. 30, 2013, which claims the benefit of U.S. provisional application 61/707,588 filed Sep. 28, 2012, the disclosures of which are incorporated by reference in their entirety.

FIELD OF THE INVENTION

The present invention relates to the field of pairing wine and music selections, and more particularly to a system and method using specialized software programs, that matches wines and music based on characteristics of each stored in a particularized database.

BACKGROUND OF THE INVENTION

There has been a long practice of pairing wine with food, but only recently has it been recognized that wine and music, if properly matched, may also enhance one another. In selecting both and wine and music, users often turn to well-known reviews for suggestions. With respect to wine, these reviews often include tasting descriptors and sometimes a wine score. These wine reviewers perform a valuable service to wine users, who often use the reviews and associated scores to make reasoned decisions as to whether or not they would enjoy the wine. However, there are many wine users that simply do not and cannot relate to the way that wine is described in most traditional wine reviews. Indeed, some have ridiculed the descriptors used by wine reviewers as being out of touch with how many folks perceive wine.

With respect to music, there has been a recent trend towards making customized playlists and suggesting new or related songs to a listener based on previous song, artist, or album selections and purchases. For example, the Apple's iTunes® Genius feature automatically generates a playlist of songs from the user's library which are similar to a user-selected song while the iTunes Sidebar recommends additional music selections for purchase from the iTunes Store based on selections a user makes within their music library.

Entities like Echo Nest have built databases and programs capable of categorizing music based at least in part characteristics such as tempo, tone, range, melody, harmony, rhythm and dynamics. After determining which songs a user already enjoys listening to, these databases and programs are able to predict additional songs that a user may enjoy by searching the database for songs with similar characteristics. Additionally, there has been a rise in popularity of Internet radio stations such as Pandora, which use algorithms to suggest songs that a user may enjoy based on the user's pre-selected "stations" of music or other artistic favorites. These trends allow music listeners to create customized music listening experiences, tailored to their own specific tastes and preferences.

Although others have observed some general associations between wine and music, the prior art has not created a comprehensive system or methodology of characterizing wines or music using one another's descriptors, much less matching wines with music based on each's characteristics. At most, the prior art has sparingly used general music references when describing a wine, such as "a symphony of tastes" or "high notes" and "low notes". For example, no one has attempted to describe wine in a manner akin to a traditional wine tasting note using musical terminology to convey the expressions of the wine to the potential wine user.

A comprehensive database and matching system and method based on musical terminology and wine descriptors has not yet been utilized to pair wine and music selections, or suggest wine or music purchases. According to some embodiments, the present invention allows for the creation of a comprehensive database that may be used to match both wine and music by determining relationships based on a common (as between wine and music) musical or wine descriptor terminology. In addition, some embodiments of the present invention provide a method for using user preferences, previous purchases, and the stored characteristics of both wine and music to provide music selections, wine selections, and wine/music pairings that are tailored to a user's specific tastes.

SUMMARY OF THE INVENTION

Music is considered by some to be a universal language, one that can be used to provide descriptors of both wine and music. Wine users may provide musical descriptors of wine when explaining various tastes and textures of a wine. In some cases, music-based wine descriptors are easier for lay wine users to understand that conventional wine descriptors.

In one configuration a user may identify a bottle or type of wine that they would like matched with music using a database identifier, such as a number. For example, a mobile device may be used to scan a bottle of wine, and a software program running on the mobile device may determine a number from the scan, and may transmit that number to a database (either on a server or the mobile device.) Using the number as an identifier for the wine, the software program can determine a song that has a high match quality index (i.e. the wine and song are paired well). Having a relatively high match quality index as compared to a random pairing of a wine and song may indicate that a statistically significant amount of people would select a particular as matching well with the wine being consumed as compared to random songs. Having a measured high match quality index may indicate the match analyzer 110 has determined that the wine and song have descriptor values that match better than the average match quality index for that wine and random song. In some configurations the database of songs will be limited to the songs on the mobile device, but in other cases it can be a large commercial library (like Pandora.) In the latter case, when the software program 10 receives the numeric identifier for the wine (Wine Id), it determines a matching song (one with a high match quality index) and directs an internet radio application 38 (like Slacker or Pandora) to play songs similar to the matching song. In some configurations, the software program may direct the user to an option to purchase the music from an online music store. Some configurations may be used in a restaurant, wherein the wines are presented on a mobile device to the diner (or the diner uses his or her own device and logs into the restaurant's menu.) The diner may select from a menu of wines to order, and in making selection through the software program, the software program instructs a music player at the diner's table to play songs pair with the diner's wine selection.

DETAILED DESCRIPTION OF THE INVENTION

Figure 1A:
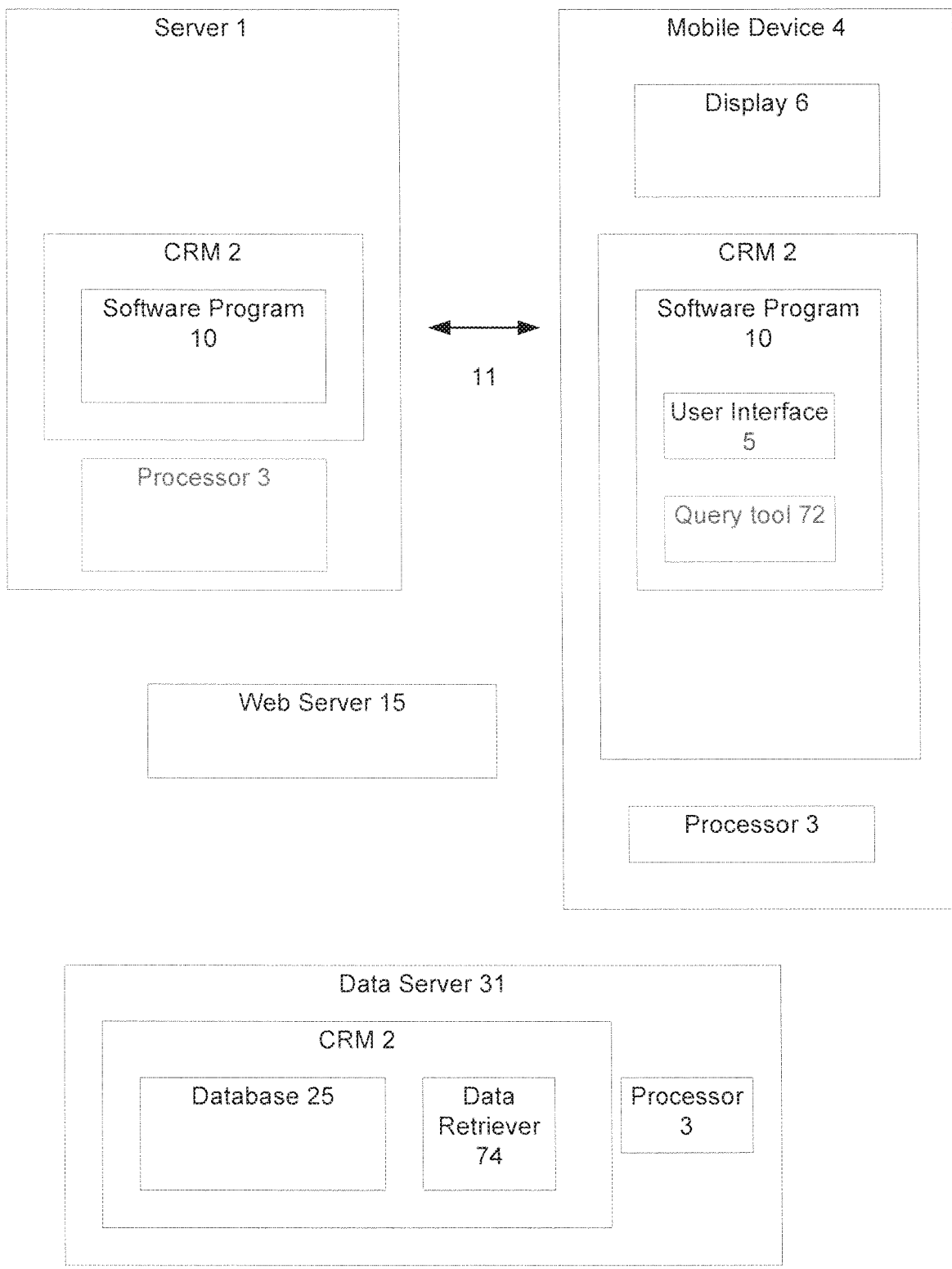
FIG. 1A illustrates components a system selecting a song associated with a wine selection.
Figure 1B:
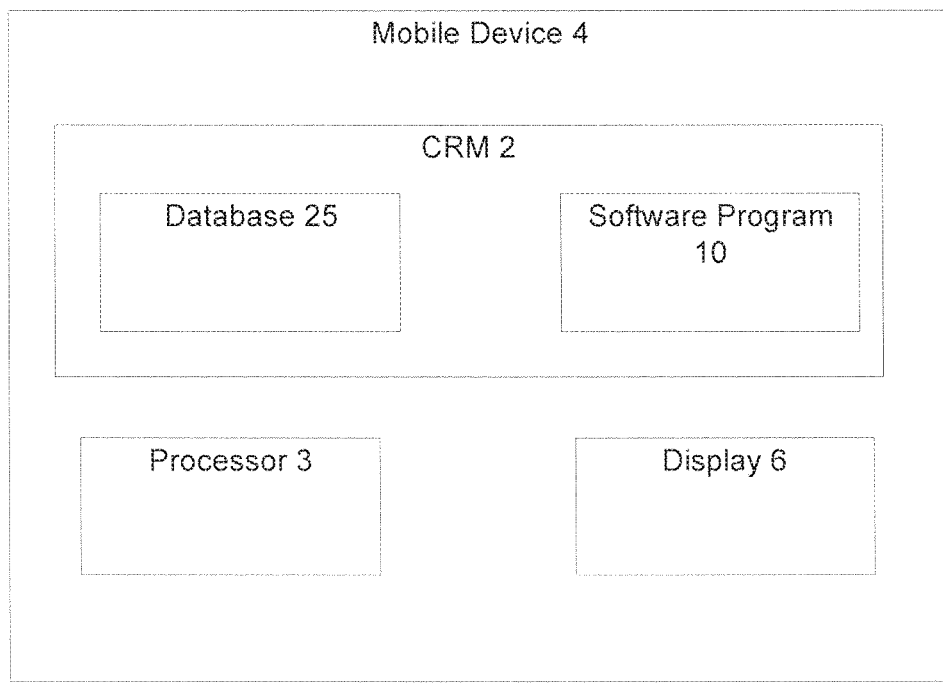
FIG. 1B illustrates a mobile device comprising a database configured to store wine and music selections.

A method, software, specialized machine, and/or system configured to determine, store, aggregate, anonymize, and/or analyze descriptors and relationship of wine and music is disclosed. As shown in FIG. 1A, a software program 10 is provided that may be configured to create and/or store wine and music pairings. The software program 10 may be stored on tangible computer readable storage media (CRM) 2, and may be executed by a processor 3 on the client, server 1, or a standalone device. A database 25 for storing music and wine descriptors, values, and pairings may be stored on the server 1 or on a data server 31. The software program 10 may be configured so that it runs on a client and server topology (e.g. a plurality of iPhones communicating with a cloud powered by a plurality of servers.) As shown in FIG. 1B, the software program 10 may also be configured so that it runs primarily on the mobile device 4. The mobile device 4 may comprise a display 6. As an example, in the standalone configuration, the mobile device 4 may comprise a database 25 for storing wine and music descriptors and wine-music pairings. In the client-server configuration, the server may comprise the database 25. The database may also be stored on an independent server that receives database queries (e.g. SQL requests), processes them, and returns a value.

Wine and music collectively have hundreds of words used to describe their particular features, characteristics and nuances. In this application, the terminology used to describe wine, music, and other items are called descriptors. Wine and music have some descriptors in common. "Complex" for example can be used to describe a wine that has a number of flavor components and also in music "complex" describes music in which a number of musical instruments are playing simultaneously. Some descriptors are unique to wine or music. For example, "creamy" has an understood meaning for the texture of wine, but does have much of a definition in music. Wine may also be thought of as having a continuum, including a beginning, middle and end. Similarly, music can be thought of as having a distinct beginning, middle and end. Wine and music can both be described in terms corresponding to where the wine or music places on a scale of high to low depth (lighter fruit such as strawberry may be associated with higher musical notes while deeper fruit such as blackberry may be associated with lower musical notes). Music and wines also have tones for example. The taste of wine and feel of wine in the mouth can be thought to have a flow and rhythm, similar to the flow and rhythm in music. In some configurations, the structure, taste, body and other sensory aspects of wine may translated into descriptors used for music.

As shown in FIG. 1A, the software program 10 (as stored on tangible computer readable media such as a memory chip or hard drive) may comprise a user interface 5, and link and analyze a database 25 of stored descriptors for wine and music, and determine which song from the database is most similar to a wine, or vice versa. Selecting a highly ranked song (one that scores high on a match quality index 99 generated by a wine-music analyzer 80, see FIG. 5) may provide an improved experience in consuming the wine and/or listening to the music.

The musical descriptors may include features related to melody, harmony, rhythm and dynamics. Attributes for the descriptor melody may include range, shape, and movement within the broader melody descriptor. The melody descriptor may also include information as to whether it is conjunct or disjunct. Harmony may be classified as consonant or dissonant. Within the descriptor category of rhythm, sub-categories related to syncopation or accent may be included. In addition to these, musical descriptors such as pitch and tone color may be included. For example, tone color is another term used in connection with analyzing music. A trumpet may be distinguished from a flute even when each is playing the same note at the same dynamic level because each has a different tone color, or timbre. Tone color is described by words like bright, dark, brilliant, mellow and rich. These same terms used to describe tones are also often used in describing wine, and the match analyzer of the present invention may be configured to determine wine and music selections with the same tone color descriptors as part of its wine-music pairing process.

Figure 2:
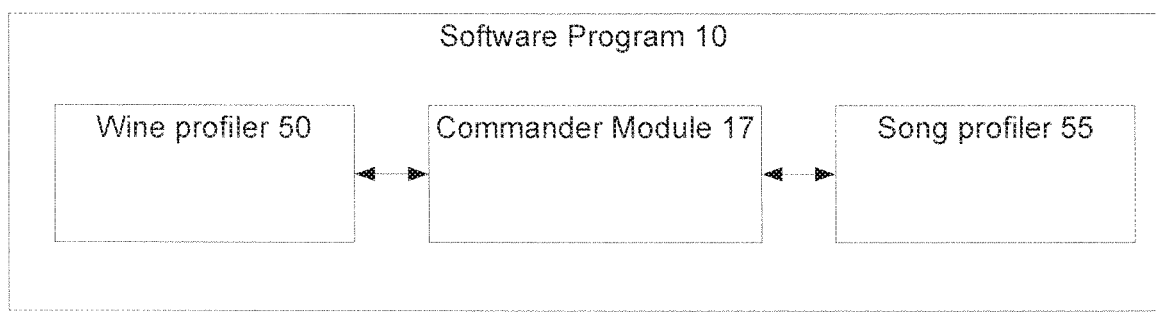
FIG. 2 illustrates a software program comprising a commander module and wine profiler and song profiler.
Figure 3:
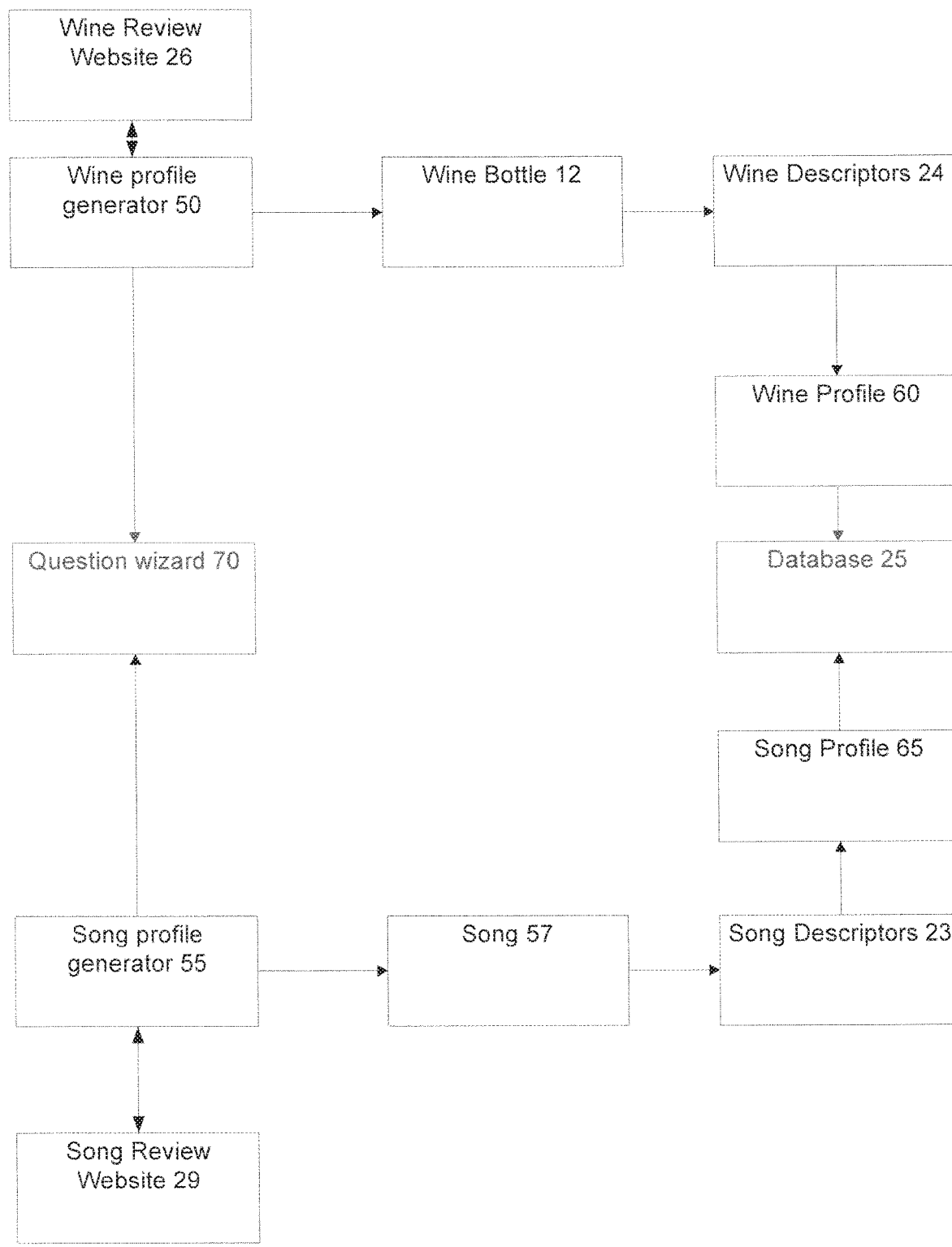
FIG. 3 is a schematic of the song and wine profiler, question wizard, database, etc.
Figure 4:
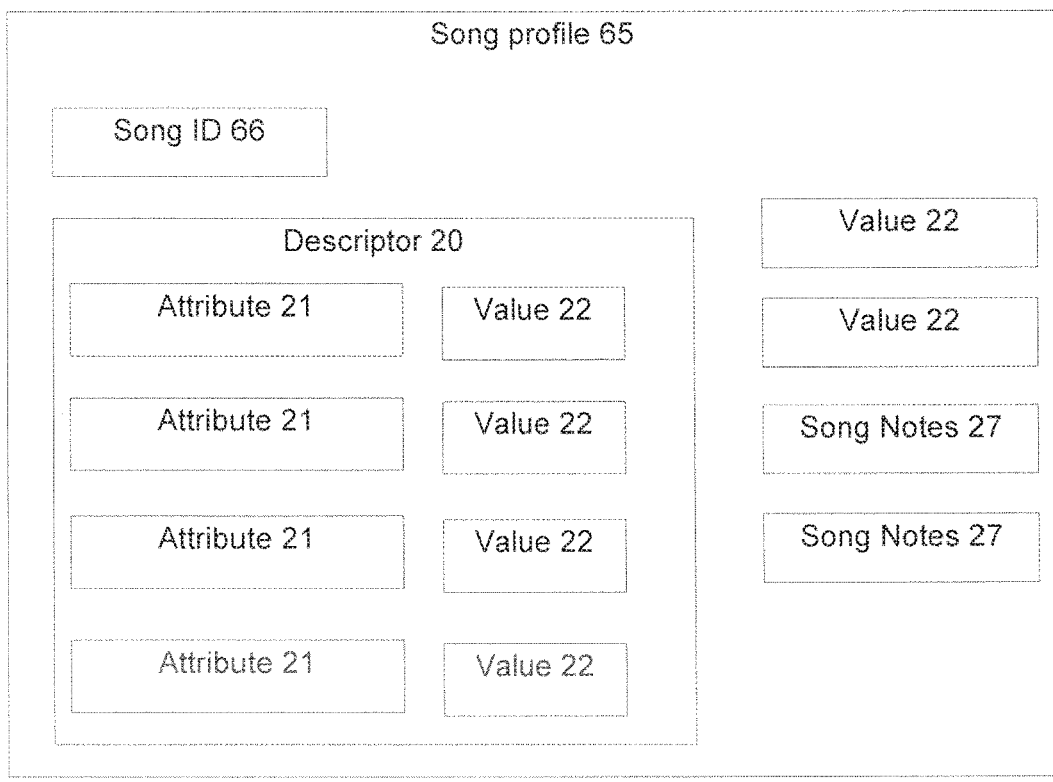
FIG. 4 illustrates music and wine profiles.
Figure 4:
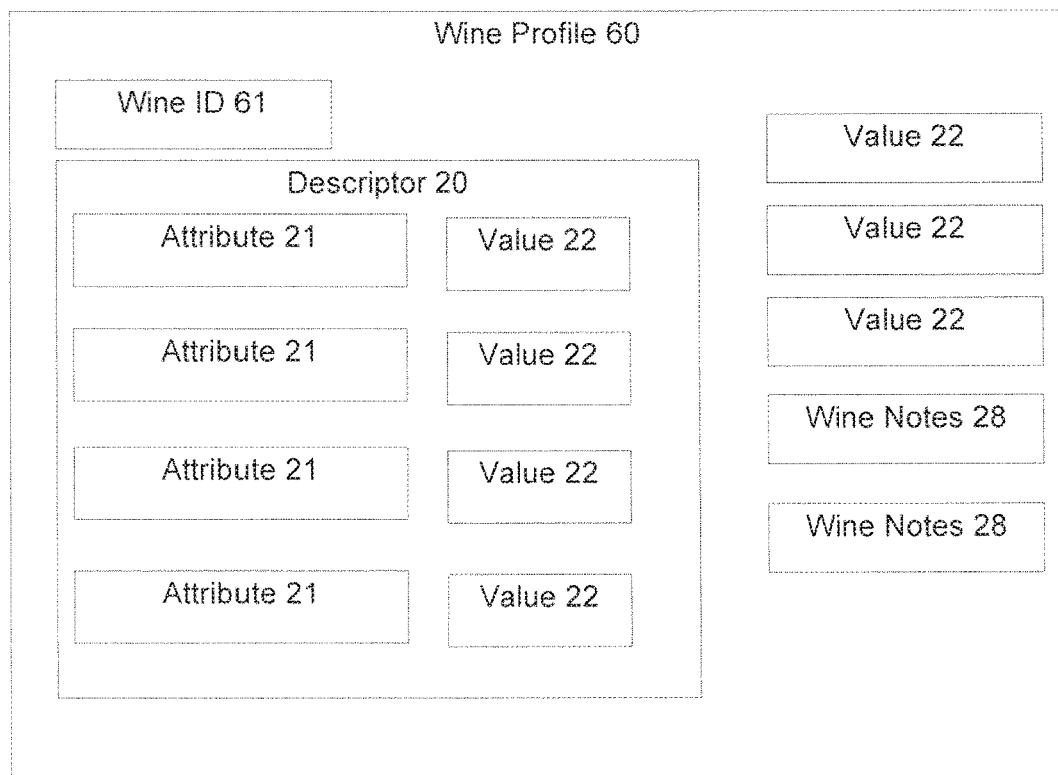

As shown in FIGS. 2, 3, and 4, the software program 10 may comprise a commander module 17 configured to direct different modules to generate and send queries to the database, determine pairings of music and wine, and/or analyze match quality index of a wine and music. In one configuration, the commander module 17 may direct a wine profiler 50 and/or a song profiler 55 to generate descriptors for wine and music profiles. The wine profiler 50 may determine wine descriptors 24 for a bottle of wine to generate a wine profile 60, and may scour or scrub information from one or more wine review websites 26. The song profiler 55 may analyze a song 57, determine one or more music descriptors 23 for the song to create a song profile 65, and/or extract data from song review websites 29. Both the wine profile 60 and song profile 65 may comprise a plurality of descriptors 20, and profiles may be stored in the database 25. Each descriptor may comprise a plurality of attributes 21, and each attribute 21 may comprise a value 22. The descriptor 20 itself may comprise values 22. Each profile may comprise an ID, for example the wine profile 60 may comprise a wine ID 61, and the song profile 65 may comprise a song ID 66.

The values for the descriptors 40 may be determined through building in a question wizard 70 into the software program 10 to ask users to select values 22 for particular descriptors and attributes 21 of the wine he or she is drinking or music he or she is listening to. The profiles generators may receive these values and store them as a part of composite values for those descriptors 20 and attributes 21. For example, the question wizard 70 may be configured to ask one hundred users to rate on a scale of one to ten the depth of the same bottle of wine. The wine profiler 50 may be configured to determine an average from these ratings and store the average as a composite rating.

Values for descriptors 20 and attributes 21 may also be stored directly in database during the programming of the machine or computer running program. The software program may be configured to start with pre-stored values for some or all of the descriptors and allow user feedback to modify the pre-stored values.

In some configurations, software program may comprise a music analyzer 84 to determine values 22 for music descriptors and attributes. (The music analyzer and the wine analyzer may be a component of the wine-music analyzer 80.) Some music descriptors may be easier to determine via software analysis such as tempo and scale as compared to descriptors like brilliance and color (which generally involve a more human/subjective analysis.) The software program may utilize regression techniques to determine values for these subjective descriptors based on a sample set. For example, the software program 10 may instruct the question wizard 70 to ask three hundred users to identify the color of a song. The music analyzer 84 may review the results to determine whether users picked a particular color with higher frequency. The music analyzer 84 can repeat this test with several other songs to determine which colors users pick. Once a sample set is created, the music analyzer 84 can determine whether other descriptors (not color) can be used to determine a song's color based on the sample set.

Figure 5:
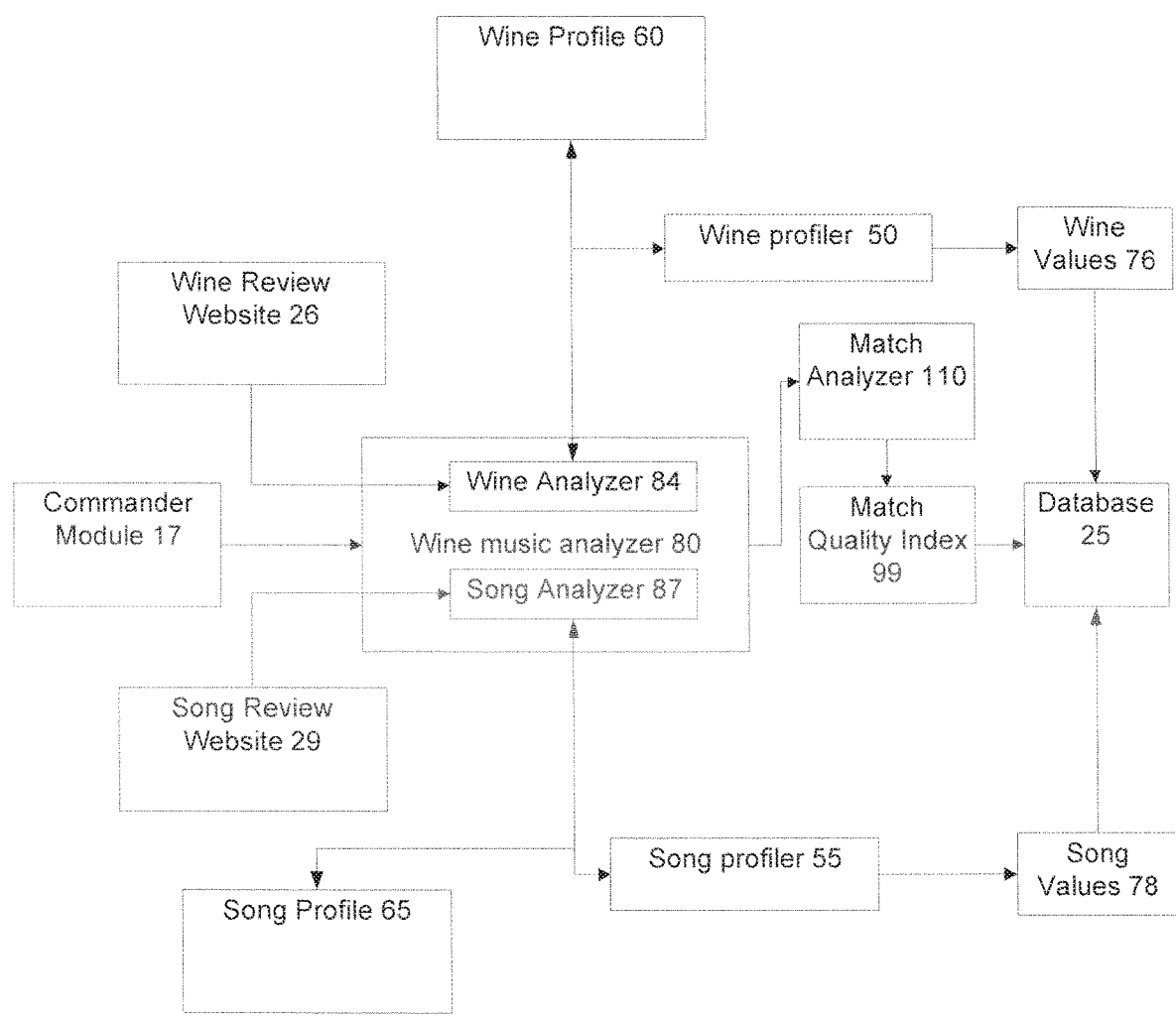
FIG. 5 is a schematic comprising the wine music analyzer and match analyzer.

As shown in FIG. 5, the software program 10 may similarly comprise a wine analyzer 84. In some configurations the wine analyzer 84 may be configured to search for and determine descriptors of wine on the internet websites that have wine reviews. The wine analyzer 84 (or the wine profiler 50) may obtain wine descriptors from the website. If the wine analyzer 84 is only able to obtain descriptors such as year, producer, grape varietal, it may extrapolate from these obtained descriptors other descriptors not available on the website. Moreover, the wine analyzer 84 may be configured to instruct the question wizard 70 to ask users to provide values 22 for these less commonly available descriptors. The wine analyzer 84 may be configured to determine patterns in the less commonly available descriptor values based on the values of more commonly available descriptors. If a pattern is recognized, the wine analyzer 84 may be configured to provide estimates for these descriptor values, and instruct the wine profiler 50 to modify them as the question wizard 70 receives responses. Once the wine analyzer 84 determines the descriptors (including wine values 76 and song values 78), it may store them in database 25.

The database 25 may be stored on a server at a host computer, or may be stored locally on a memory in a user device or in a mobile application. When stored locally, the database may be downloaded onto a local storage medium located in a laptop, PC, smartphone, tablet, or other computing device. The software program 10 may be executed from any of these devices as well. When stored on a server, users may access the database through wired or wireless communication methods over a network. For example, the database 25 may be accessible through a webpage accessible over the internet. Additionally, the database 25 may be accessed through a mobile application run on a user's smartphone, tablet, laptop, computer, TV, PDA, or other mobile device (collectively "mobile devices").

The music analyzer 87 may categorize and group songs according to similarity based on known and detailed music criteria. The music analyzer 87 then finds songs that the user may like based on similarity of structure, tonality, rhythm, and other musical descriptors shared between both the wine and music entries in the database. Once the songs are selected, the song selector 30 may receive an exemplary wine (e.g. a bottle of 2009 Mondavi Reserve Cabernet Sauvignon) and determine song pairings in virtually any musical genre such as classic rock, alternative rock, punk, country, blues, hip-hop/rap, R&B, reggae, jazz, classical, song or artist. These pairings may be further broken down into other more narrow categories.

Figure 6:
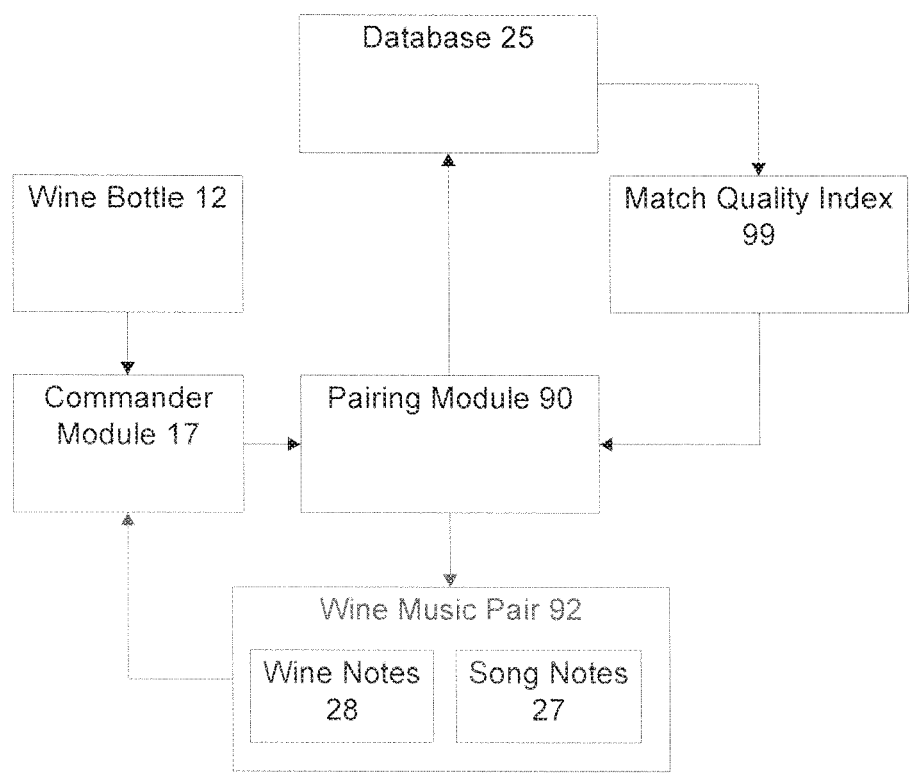
FIG. 6 is a schematic comprising the pairing module.

In FIG. 6, the commander module 17 may also direct a pairing module 90 to pair a particular wine with a particular song (called a wine-song pair). One wine may be paired with multiple songs, and multiple wines may be paired with the same song (e.g. one to one, one to many, many to one, and many to many pairings are possible.) A wine-music pair 92 may have a match quality index 99 that may be expressed as a percent. A higher percent may indicate a better match. The match quality index 99 may be determined by a match analyzer 110 configured to analyze descriptors and attribute values for a particular song and particular wine to form a wine-song pair. In some configurations, the pairing module 90 may be configured to receive a wine-music pair information directly from a user either manually or through a batch upload (e.g. uploading a spreadsheet of matches.) Wine pairing or matching can be made subjectively without storing any descriptors and then stored as a pre-filled match. As shown in FIG. 4, the database may allow a user to store song notes 27 and wine notes 28 for each wine-music pairing. The commander module 17 may store the wine-music pair 92 in the electronic database.

The database 25 itself may be configured in a variety of ways, but one example storage mechanism would be the following charts.

TABLE 1

Wine

| Wine Id | Name | Wine Details | Wine Descriptors |
|---------|------|--------------|------------------|
| 01115 | Specific Wine A | Table 2 | Table 3 |
| 01116 | Specific Wine B | Table 2 | Table 3 |
| 01117 | Specific Wine C | Table 2 | Table 3 |

Table 1 uses Wine Id as the primary key and uses a relational database model to store Wine Details and Wine Descriptors. The pairing module 90 may need to determine the wine details and wine descriptor in order determine a wine-song pairing. Thus, the pairing module may direct a query tool 72 to collect this information. The query tool 72 may generate a query to be received by a data retriever 74. For example, the query may be get.Winedetails(01115) or getWinedetails (01115). When the primary key is received (and alternatives not relying on a primary key are possible), the data retriever 74 would open the WineDetails table—Table 2.

TABLE 2

Wine Details

| Wine Id | Winemaker | Winery | Geographic area | Grape Type | Years | ... Descriptor X |
|---|---|---|---|---|---|---|
| 01115 | Person A | Vineyard A | Walla Walla Valley Oregon | Pinot Noir | Very Full | |
| 01116 | Person B | Vineyard B | Tuscany, Italy | 80% Sangiovese 20% Merlot | Somewhat Full | |

Table 3 illustrates an example of some of the wine descriptors. In some configurations Table 2 and Table 3 may be merged into a single table.

TABLE 3

Wine Descriptors

| Wine Id | Descriptor A | Attribute | Value | Descriptor B | Attribute | Value ... Descriptor X |
|---|---|---|---|---|---|---|
| 01115 | Color | Red | #800000 | Structure | Tight-Flabby | 7 |
| 01116 | Color | Red | #700000 | Structure | Tight-Flabby | 3 |

Attached in the IDS submitted contemporaneously herewith are publications explaining elements of wine descriptors and music descriptors. The publications and website printouts listed as Non-Patent Literature items 12-30 in the IDS submitted contemporaneously herewith are incorporated by reference in their entirety.

Attached at the end of the disclosure are a series of spreadsheets. Spreadsheet 1 provides a list of 174 wine descriptors that are listed on Wikipedia. Spreadsheet 2 provides a list of 15 music descriptors. If one were to use all 174 wine descriptors and 15 music descriptors, the music analyzer 87 relationship would be as shown in Spreadsheet 3. Research from the inventor has shown that the descriptors shown in Spreadsheet 4 provide examples of information about the wine and music that is useful to determine a wine-music paring. Moreover, the inventor has also determined that the descriptors in Spreadsheet 5 provide examples of information about the music that is useful to determine a wine-music paring. Spreadsheet 6 illustrates the intersect between the wine descriptors 24 and music descriptors 23. The match analyzer 110 may be configured to analyze the values for the descriptors and determine a match quality index 99 as shown in Spreadsheet 7. Spreadsheet 7 also shows some exemplary values for the descriptors and an exemplary match quality index.

Figure 7:
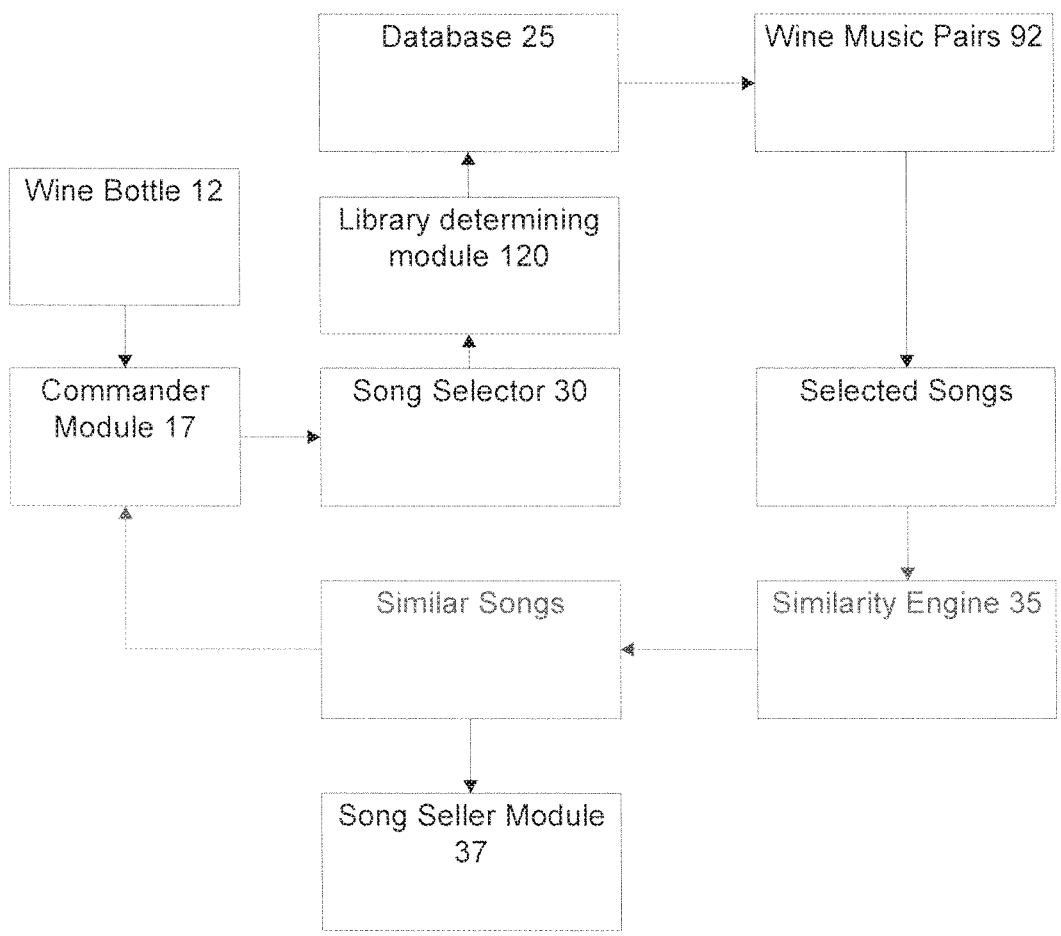
FIG. 7 is a schematic comprising the song selector and similarity engine, inter alia.
Figure 8:
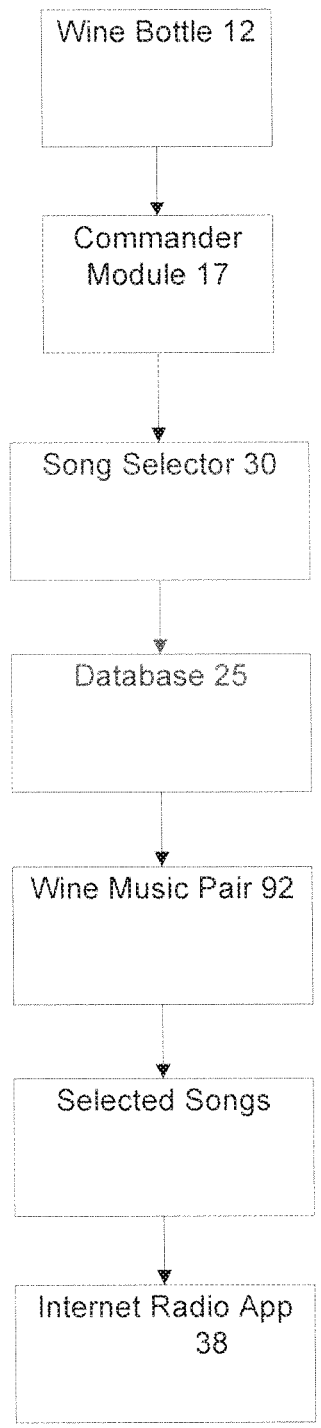
FIG. 8 is a process flow of scanning a wine bottle and listening to a paired song on an internet radio app.

In FIG. 7, the match quality indices between wines and songs will be prefilled. In such configurations, the commander module 17 may direct a song selector 30 to select a song from a subset of the songs that has the highest match quality index for that wine. The subset of songs may be a copy of the songs on a user's computer or mobile device, a user supplied or denoted list, a shared library of songs, or a roster of songs in a subscription service (such as Pandora radio or Slacker radio). The software program may comprise a library determining module 120 in order to determine the songs in the memory or storage media of the mobile device. The software program on the mobile device may comprise instructions to send a filtering instruction to the server 1, so that the server filters the song profiles in the database to process only songs in the memory or storage media of the mobile device. In some configurations the software program 10 may offer the user an option to buy songs that have a higher match quality index than the ones in the user's subset. Songs may be purchased through internet suppliers like iTunes and Amazon (song seller module 37.) Some configurations of the software device will comprise an app caller 115 configured to call an internet radio application 38 (like Shoutcast, Napster, Musicmatch, Slacker, Pandora, etc.) and instruct that application to play the specified song and/or similar songs.

According to some embodiments, the matching may be done by analyzing the profile entry of a selected wine or song, and then searching for corresponding wine or song entries that have profile entries containing at least one descriptor found in the profile entry of the selected wine or song. The matching program may rank the determined matched pairings based on the number of shared characteristics within the profile entries.

Figure 9:
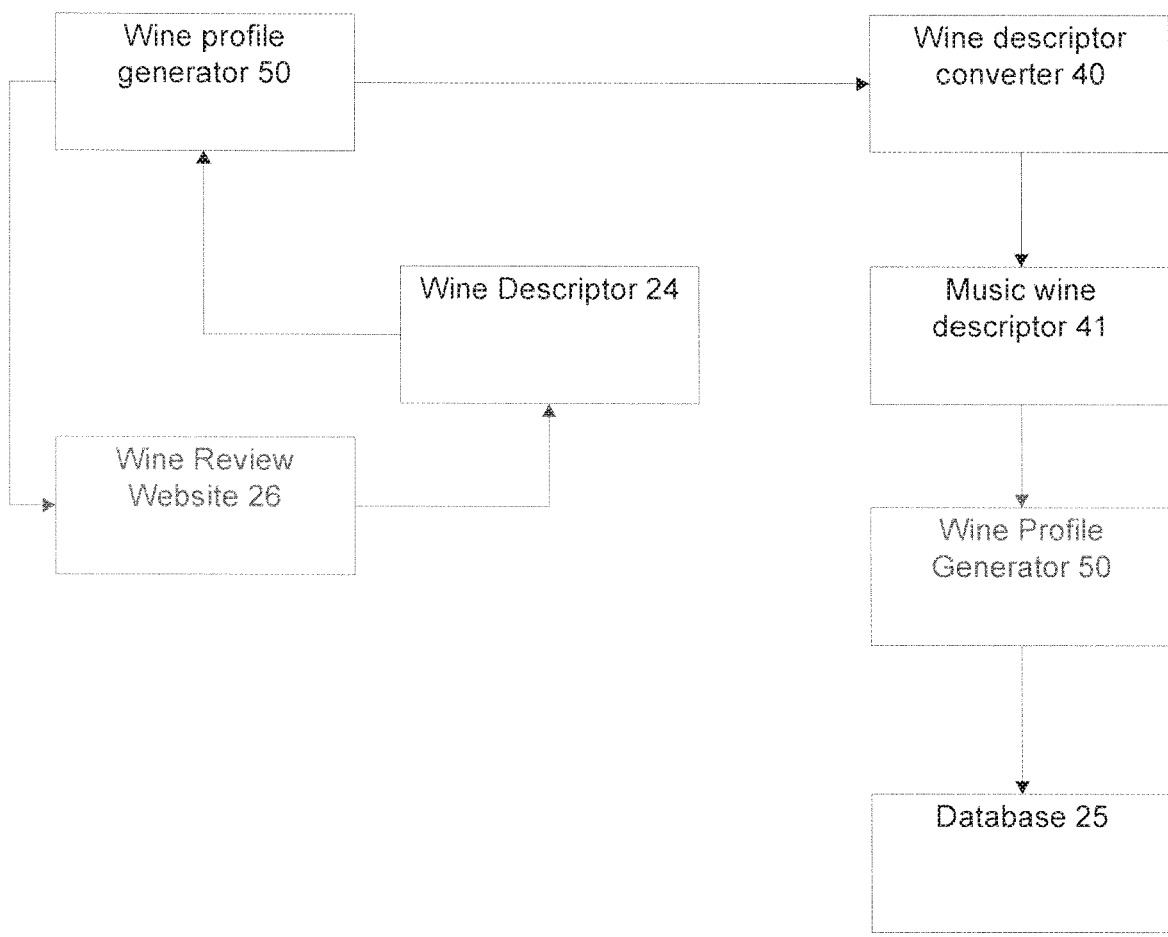
FIG. 9 is a schematic comprising the wine descriptor converter.

According to some embodiments, the match analyzer 110 may be similar to known programs, such as those used by EchoNest and Pandora which create searchable databases and use algorithms to determine matching or related entries within the database. The match analyzer 110 may analyze the digital format of a song, and may automatically determine certain characteristics of the song from this analysis for inclusion within the database profiles. The software program may comprise a similarity engine 35 used to determine wine or songs that have similar characteristics to other wines and songs. The engine may be used to substitute a song determined to have the highest match in the event the user does not like that particular song, is not able to purchase or obtain the song, or simply desires to hear a different song. Moreover, the similarity engine 35 may be configured to make predictions for wines based on wine details like: winemakers, wine producers, vineyards, geographic wine regions, grape varietals and year. The similarity engine 35 may be configured to make similarity predictions for music based on music artists, songs, albums, and genre. FIG. 9 illustrates a configuration in which the software program 10 uses a Wine descriptor converter 40 to convert standard wine reviews into musical descriptor terminology for use in the database and matching program. Alternatively, it may be optimal to combine traditional wine tasting descriptors with musical descriptors. This allows users who are tasting wines that were the subject of standard wine reviews to learn which types of conventional tasting note descriptors match to music that the wine user may like. For example, a user may access the software program 10 via a web page or an application running on a smartphone or other device. The user may upload or input the standard wine review, and the wine descriptor converter 41 may match standard wine descriptors with corresponding musical descriptors and store them into the database. In order to perform this matching, the program may search for standard descriptors stored within the database in connection with other wines, and generate a list of corresponding musical descriptors from the musical descriptors of the other wines found. Some configurations may provide the user with a set of personal wine descriptors to use as part of a user profile. The user may then input his or her own matches between standard wine descriptors and musical terminology, which are used by the program in converting future wine reviews into musical descriptors for use in the database.

In an exemplary process, the software program 10 may analyze various wines and songs to determine descriptors. The match analyzer 110 may utilize these descriptors to determine wine-music pairs. Some wine-music pairs 92 may be determined manually to serve as a basis for further analysis by the software program 10. In other cases, all or most of the wine-music pairings can be manually created. This may be useful in a restaurant or particular retail setting where this a limited wine menu and music library.

Some configurations may include music tasting notes 28 for each wine, and such tasting notes may comprise musical wine descriptors 41, traditional wine descriptors, or a combination thereof. The wine-music pair 92 may be stored in the server 1. In a configuration employing a wine descriptor converter 40, the database 25 may be populated with musical descriptors that correspond to standard wine descriptors found in existing wine reviews. The existing wine reviews (from third party websites for example) may be stored into the database 25 by the wine profiler 50. The wine descriptor converter 40 may update the third party reviews to include the determined musical descriptors. Traditional wine tasting notes may be entered into the database, either by the individual users or by a host controlling the database at the server. The processor(s) in the server 1 may execute the software program, and in turn the wine descriptor converter 40 to update the database entries with music based wine terminology. The output communication interface 11 may transmit the results to a user as an email, text or SMS message, update to a webpage, message within a mobile application, update within a program executed by a computing device and displayed to the user on a visual display, or other form of electronic communication. Alternatively, the output can consist of the paired song or songs.

Figure 10:
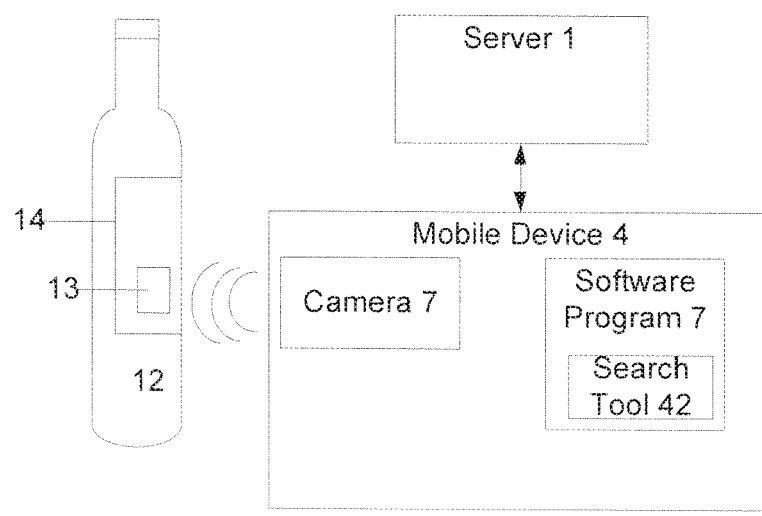
FIG. 10 illustrates scanning a code on a wine bottle.

As seen in FIG. 10, a wine bottle 12 may have a symbol 13 (or alphanumeric code) printed on the label 14 (other containers such as boxes may be used to store the wine.) The code may be used by the software program to determine the wine ID 61 for selecting an appropriate wine-song pair based on the wine ID or alphanumeric code. A user may access a webpage hosted by a web server 15 through the mobile device 4. The software program 10 may provide the user with a search tool 42 for confirming or entering in the type of wine. The database 25 may be hosted by the server 1, or the database 25 may reside on a separate computer/server. The mobile device 4 may be configured to transmit the information about the selected wine to the server 1. The server 1 may be configured to receive information about the wine bottle 12 within the database. The software program 10 may then determine a plurality of wine-music pairings having a high match quality index 99. Then server 1 may be configured to send the plurality of pairings back to the user in a response. The mobile device 4 may then play the songs, present an options of songs to purchase, retrieve the songs from an internet radio or music source, and/or store the list of pairings for future reference. The wine bottle 12 may have a bar code, QR code, image, label or symbol 13 which a user either scans or photographs with a mobile device 4 including a scanner/camera 7. The mobile device 4 then transmits the information obtained to the server 1, which searches the database 25 to find the particular wine bottle 12. Upon finding the bottle, the song selector 30 executed by the server 1 searches for musical selections determined by the matcher analyzer 110 determined to enhance the taste of that particular wine bottle 12. The server 1 may transmit the results from the match analyzer 110 to the mobile device 4 of the user. These results may include links or selectable options for the user to play or purchase the matched songs. Additionally, the server 1 may be in communication with a music program on the mobile device 4.

The barcode, QR code, image, label or symbol 13 may be presented to a user in a media advertisement, such as a print ad with a code number or scannable barcode or icon, a radio ad mentioning a numeric code, or a television or online advertisement with an audible, numeric code or scannable code or image. This code may be presented in relation to wine and music advertisements or news items.

The database and match analyzer 110 may provide a preselected list of wine/song pairings according to various genres of music based on the type of wine being consumed. The user may provide the software program with song preferences from the preselected list. The user may indicate a preference of one or several songs. The similarity engine may determine additional songs with similar characteristics to the selected songs, thereby allowing the requestor to enjoy many minutes or even hours of music matched and paired to the wine being consumed. This feature allows a user to enjoy a bottle of wine over the course of a meal with paired music, thereby enhancing both the wine drinking and music experiences.

According to some embodiments, the user may use an inverse selection process, if desired. The requestor would provide the software program 10 with a list of favorite songs, artists, albums, or other musical preferences. The software program 10 may be configured to find those music preferences in the associated database, and locate the wines that have been previously paired with the music selections. The software program 10 then may send the suggested wine pairings to the requestor.

Figure 11:
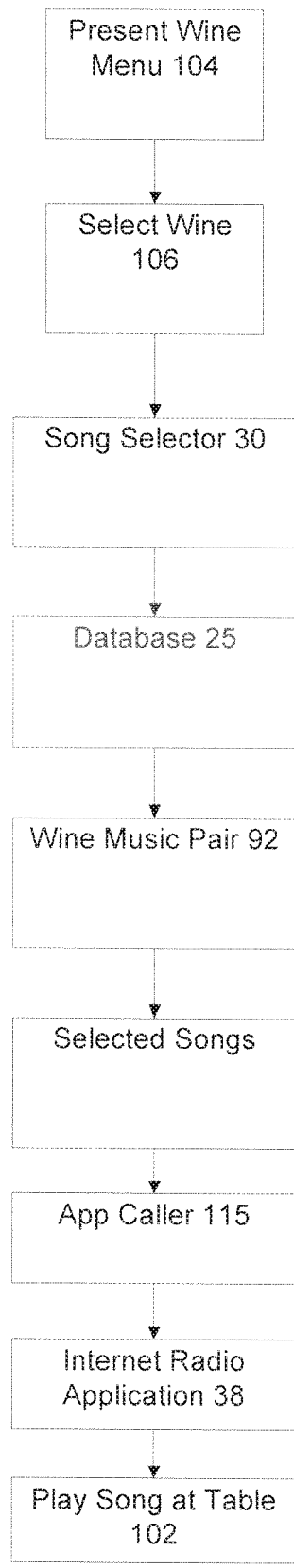
FIG. 11 illustrates a process of ordering wine and listening to paired music at a table.

As shown in FIG. 11, a restaurant can use the software-program to improve restaurant dining A database 25 featuring the restaurant's wine list is created, with optional musical descriptors being included for each bottle 12. This wine list may then be presented to the diners either in paper form or in electronic form on a mobile device 4. When the wine list is presented in paper form, a waiter inputs information regarding the selected wine bottle as part of the restaurant patron's order, and this information would be sent to the database 25. The waiter may then present the diner with the wine-music pairings generated, and the diner may select certain music from the list to be played during their meal. The restaurant may use a table-side music player such a juke box to play the song(s) while the diners are eating.

When introduced on a mobile device, the wine list may be a dataset in the software program 10. The mobile device can display the electronic wine list including optional wine-music sensory notes for each wine on the wine list. The database may comprise predetermined wine-song pairings. The user would make a selection of wine from the list (possibly via a tablet for example). The user's selection is sent to a server 1 running the software program 10. The software program 10 selects one or more songs from the restaurant's playlist. The wine-music analyzer 80 may be configured to determine songs with descriptors similar to the ones in the restaurant playlist as additional recommended music. In some configurations, the restaurant may offer these songs for the sale to the diner. Some configurations of a restaurant model of the software program (which would be stored on tangible computer readable storage media and run by a computer/server having a processor) may limit the wine menu and music lists to wines and music that the restaurant owns and serves. The restaurant may use sound barriers, electronic noise canceling technology, headphones or earphones that allow one to hear music and also participate in conversations, and/or use strategically placed speakers in headrests or in the backs of seats at each diner's place at the table. Alternatively, the music can be selected or generated by stand-alone speakers or a juke box like device strategically place on or near the table, or within listening distance of the user of the mobile device. Other known techniques of providing or generating music while allowing diners to converse are also contemplated. According to some embodiments the restaurant may provide the mobile device displaying the wine list, or the diner may provide the mobile device displaying the wine list The mobile device running the software program may display a restaurant's menu 104. Diners may interact with the mobile device to place their food and drink orders from a displayed menu. Additionally, the mobile device allows diners to make wine selections 106, which are then transmitted from the mobile device to the database and match analyzer 110. Upon locating the wine selection in the electronic database, the song selector 30 selects a matched song list for the wine selection. This list of songs may then be transmitted back to the electronic device in the form of an interactive menu for the diner to select from. In other configurations, the song selector 30 will determine a song having a high match quality index with the wine, and instruct a music player to powered by an internet radio application 38 to play that song and similar songs 102. In the alternative, the diner may begin with a music selection, and a wine selector (corresponding to song selector 30) may select and transmit a matched wine list for that music selection. The patrons at the table may make food, wine and music selections from the interactive menu, with the selected wines being brought to the table for consumption while the matched music plays at the table. The software program 10 on the mobile device may also include an option whereby the diners can send the wine-music pairings they ordered to themselves through email, text message, or other form of communication for future reference.

The techniques described herein can also be applied to other types of pairings, including, but not limited to, food and music pairings created using a similar database and matching program. For example, sodas, beer, cocktails, whiskeys, and juices may be paired with songs. Additionally certain types of foods and meals may be paired songs using certain configurations of the invention.

The foregoing description of embodiments of the invention has been presented for the purposes of illustration and description. It is not intended to be an exhaustive description of all possible aspects of the invention, and is not intended to limit the invention to the precise form disclosed. Other modifications and variations can be apparent to one of ordinary skill in the art. It is intended that the scope of the invention be defined by the following claims and their equivalents.

Case Study

The following case study tracks groups of people were given different types of wine (Veueve Clicquot Champagne, Social Cluster Viognier, Social Cluster Charviogn, A to Z Pinot Noir, and Arrowood Cabernet Sauvignon) and asked to pair them with one of five different songs (Madness, Lazy Eye, Fame, Here Comes the Sun, Californication). As the tests reveal, in all cases users identified a certain as matching better with a particular wine.

Figure 12:
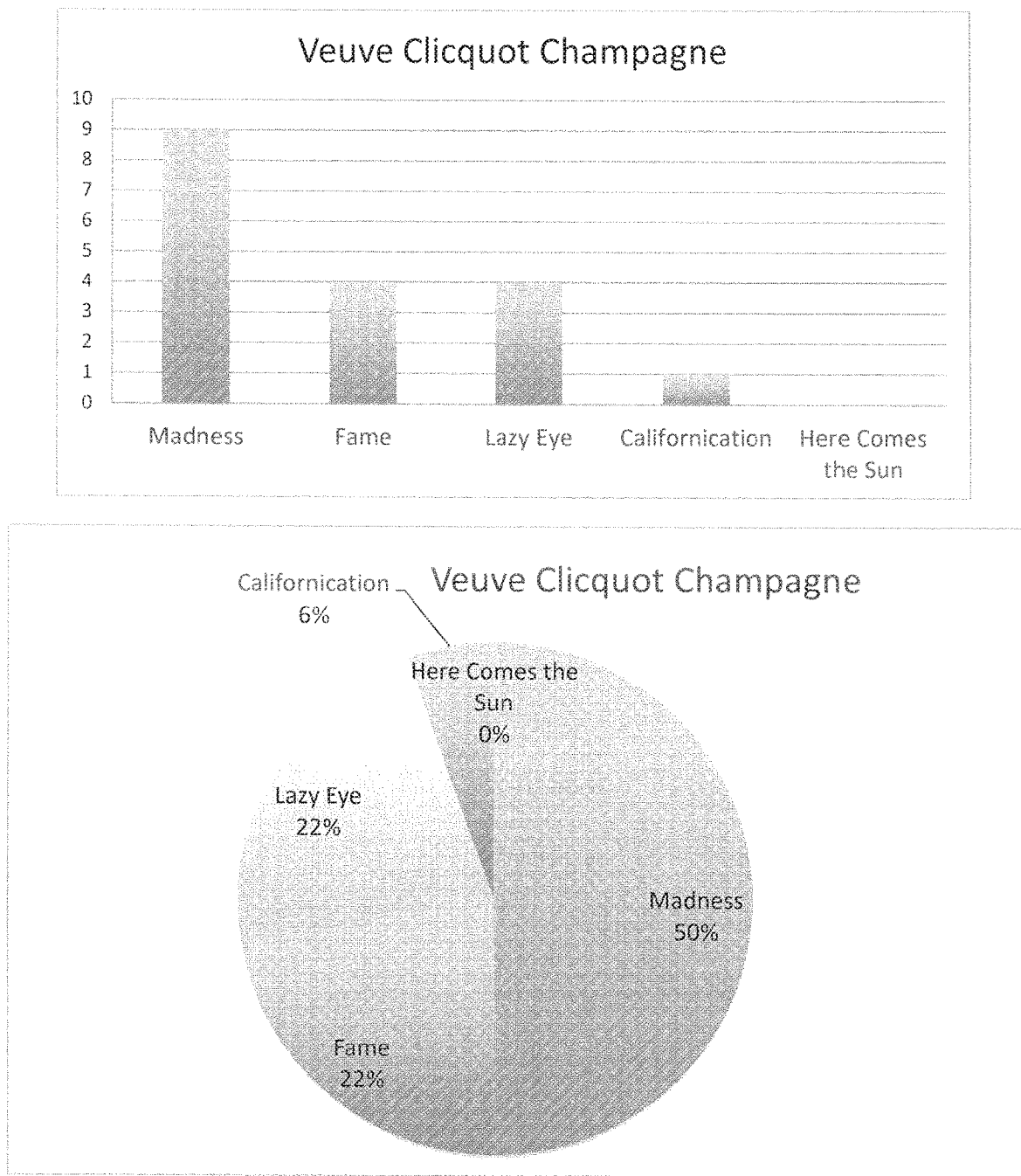
FIGS. 12-16 illustrate results from a case study of people pairing wine and music.

In test one Veueve Clicquot Champagne 44% of people chose the Madness, see FIG. 12 for the chart and graphs.

| Song | Count | Percent |
| --- | --- | --- |
| Madness | 9 | 44% |
| Fame | 4 | 22% |
| Lazy Eye | 4 | 22% |
| Californication | 1 | 6% |
| Here Comes the Sun | 0 | 0% |
| | 18 | |

Figure 13:
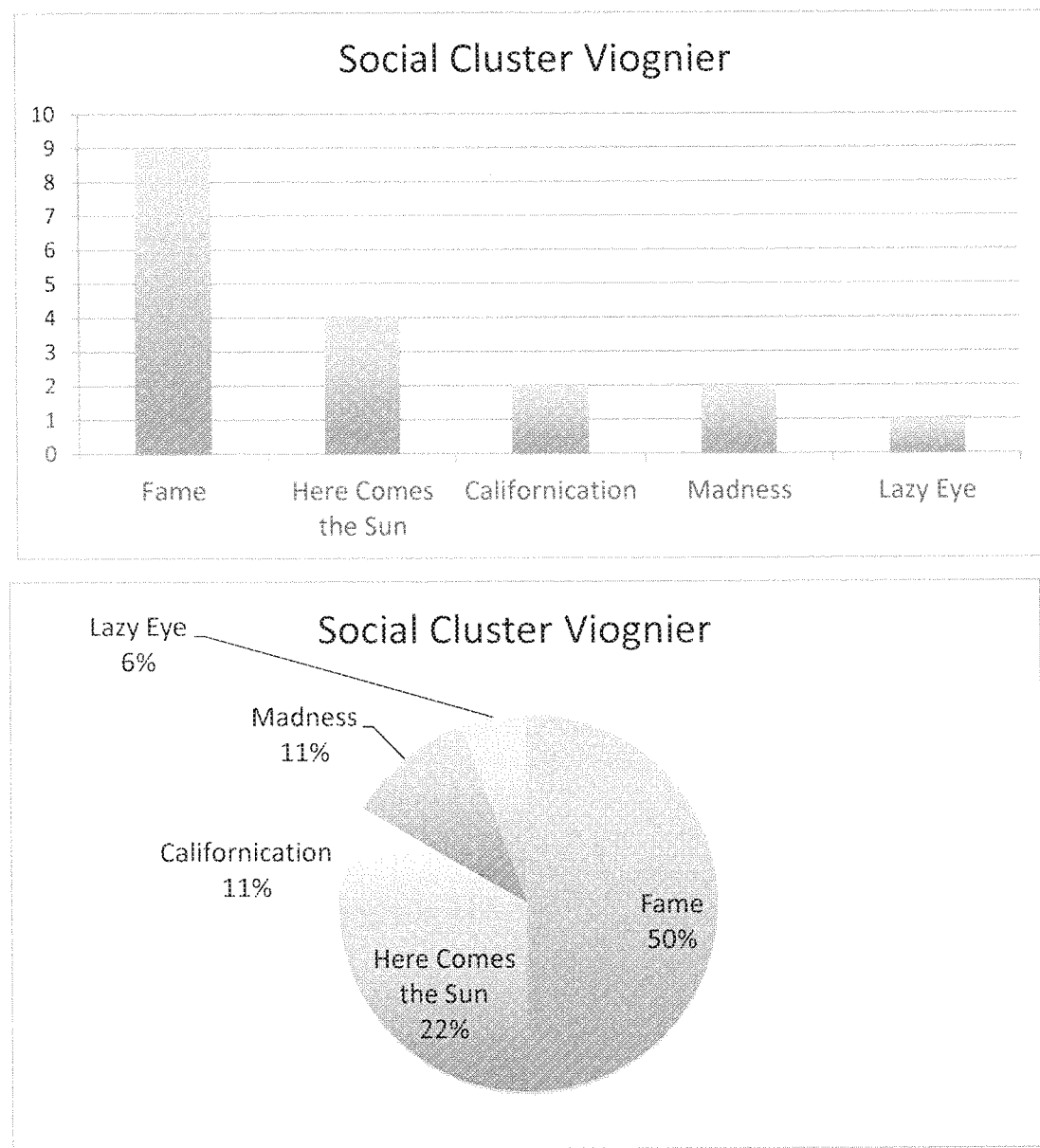

In test two, Social Cluster Viognier, 50% of people chose Fame, see FIG. 13 for the chart and graphs.

| Song | Count | Column1 |
| --- | --- | --- |
| Fame | 9 | 50% |
| Here Comes the Sun | 4 | 22% |
| Californication | 2 | 11% |
| Madness | 2 | 11% |
| Lazy Eye | 1 | 6% |
| | 18 | |

Figure 14:
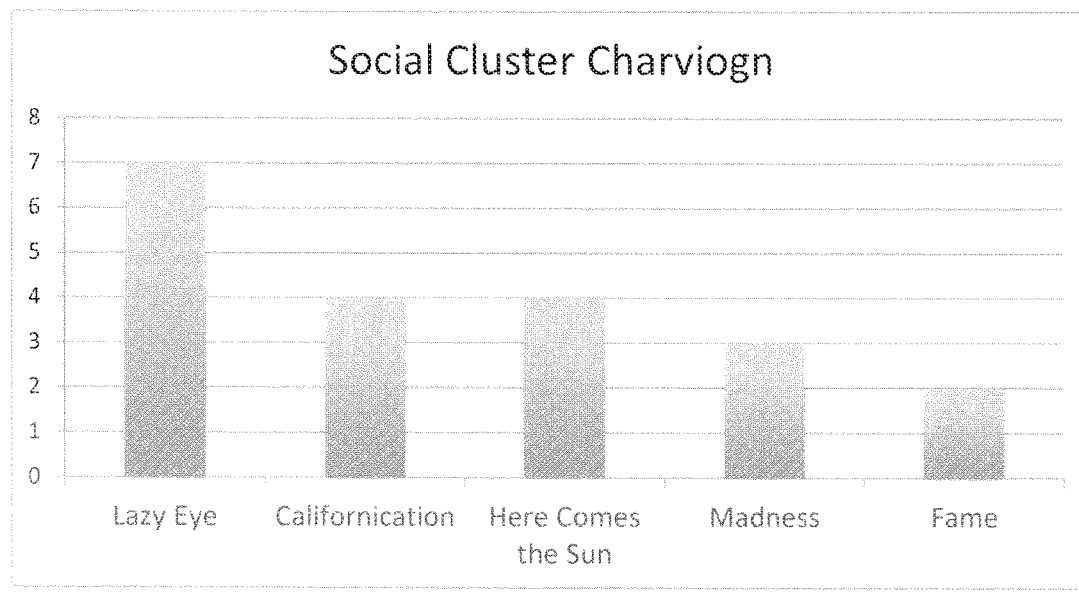
Figure 14:
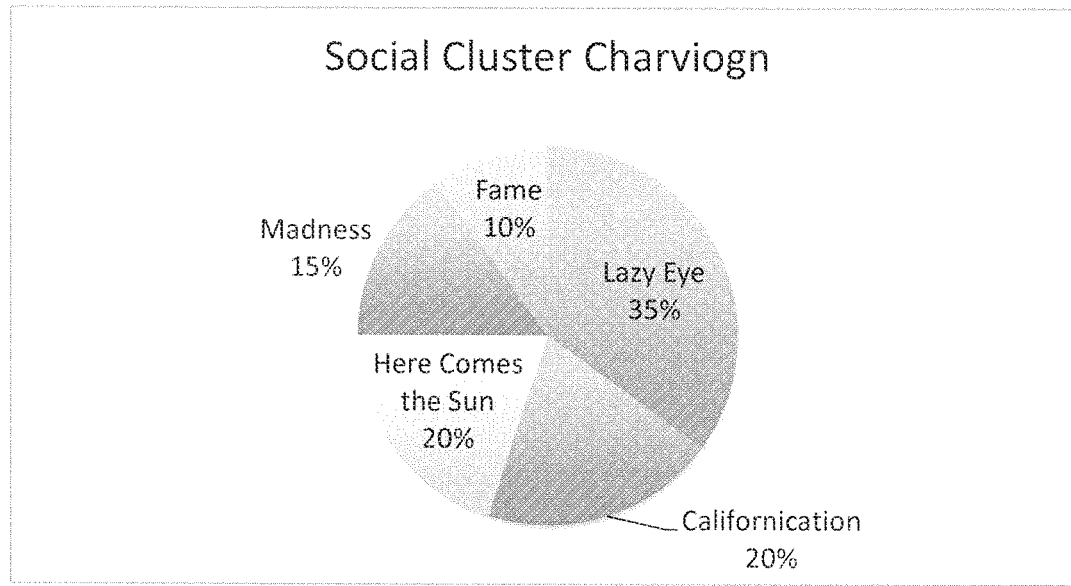

In test three, Social Cluster Charviogn, 35% of people chose Lazy Eye, see FIG. 14 for the chart and graphs.

| Song | Count | Percent |
| --- | --- | --- |
| Lazy Eye | 7 | 35% |
| Californication | 4 | 20% |
| Here Comes the Sun | 4 | 20% |
| Madness | 3 | 15% |
| Fame | 2 | 10% |
| | 20 | |

Figure 15:
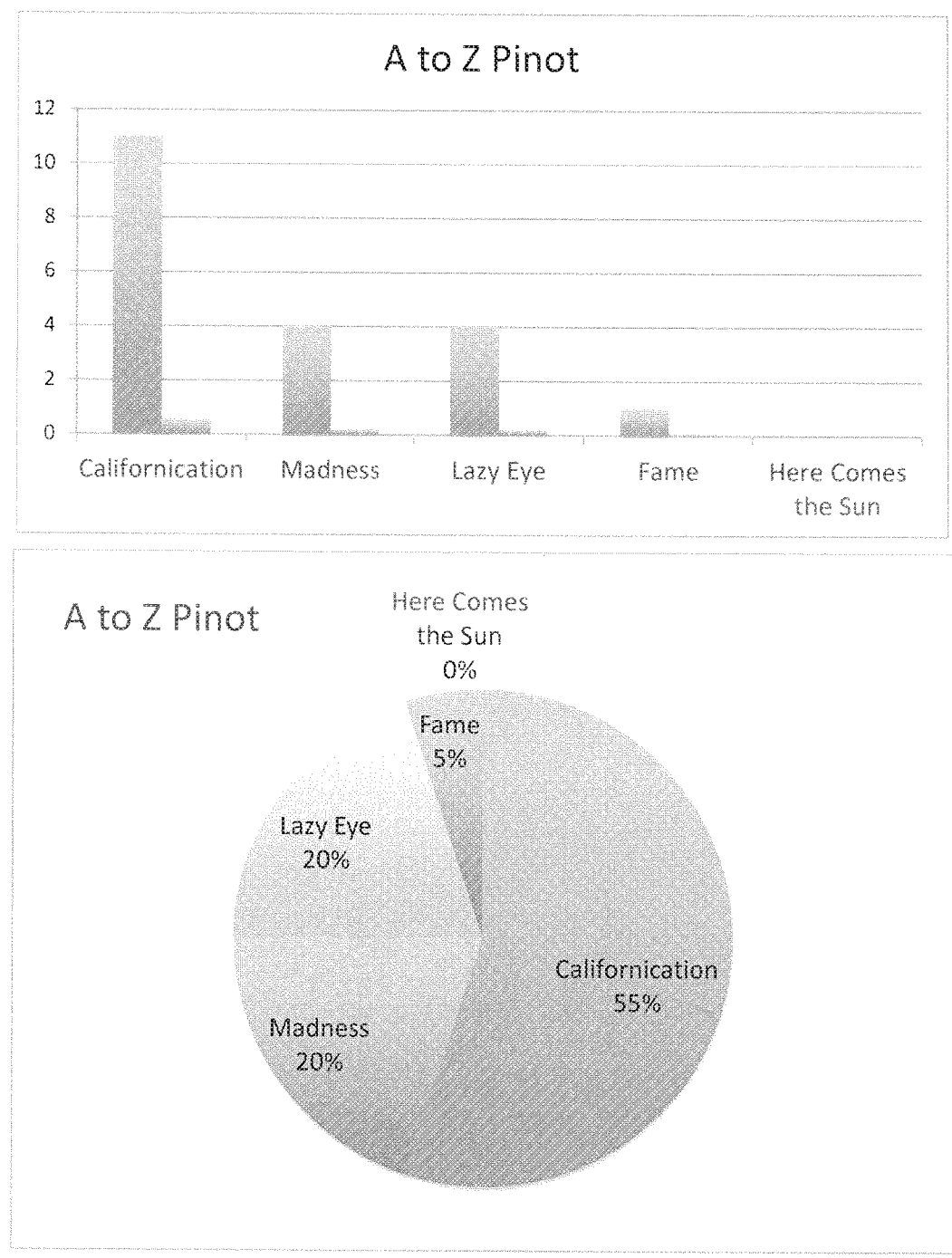

In test four, A-Z Pinot, 55% of people chose Californication, see FIG. 15 for the chart and graphs.

| Song | Count | Percent |
| --- | --- | --- |
| Californication | 11 | 55% |
| Madness | 4 | 20% |
| Lazy Eye | 4 | 20% |
| Fame | 1 | 5% |
| Here Comes the Sun | 0 | 0% |
| | 20 | |

Figure 16:
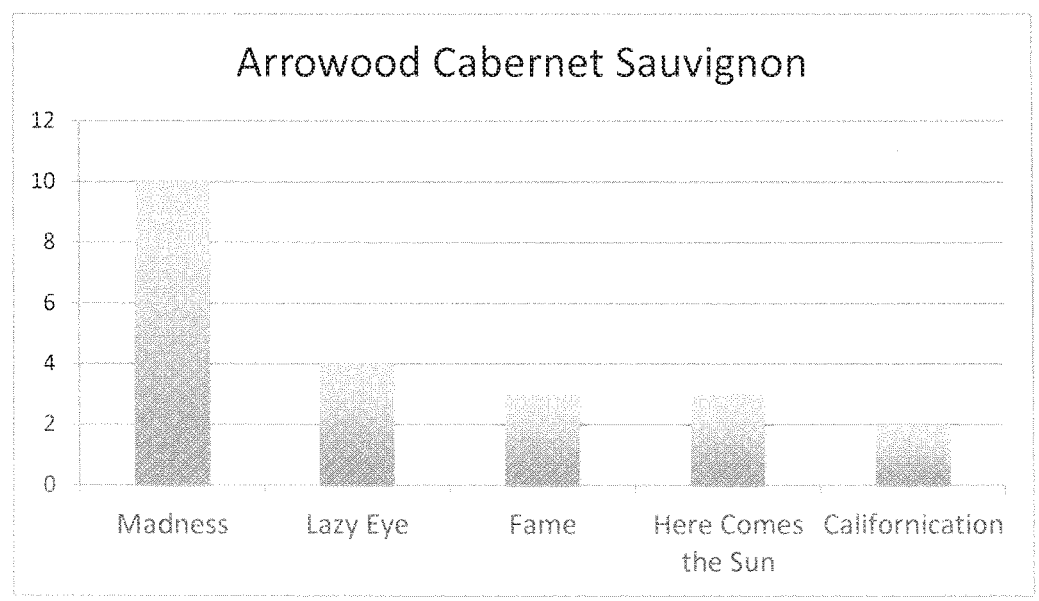
Figure 16:
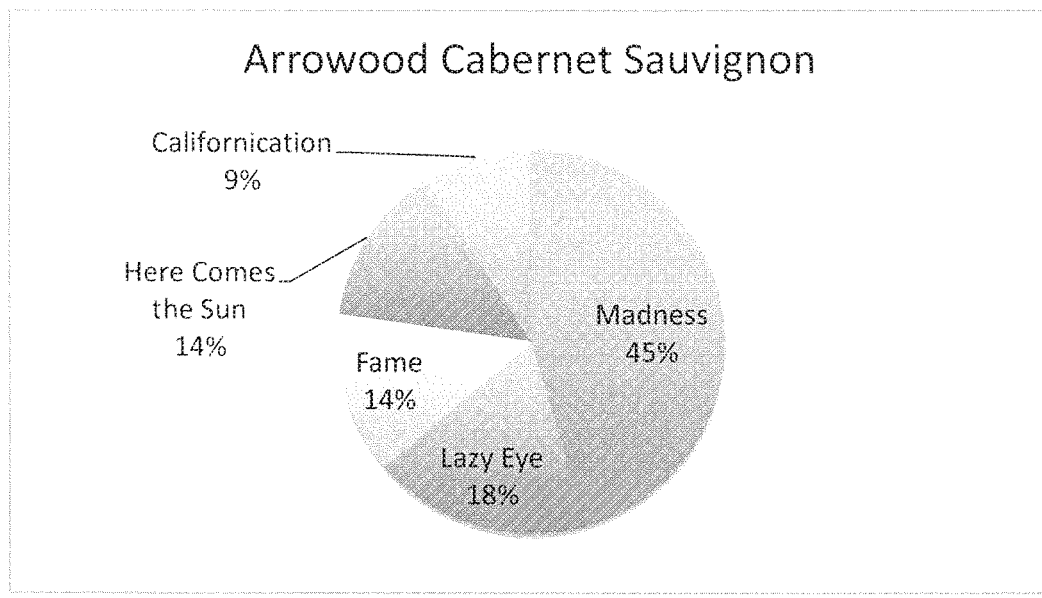

In test five, Arrow Cabernet Sauvignon, 45% of people chose Madness, see FIG. 16 for the chart and graphs.

| Song | Count | Percent |
| --- | --- | --- |
| Madness | 10 | 45% |
| Lazy Eye | 4 | 18% |
| Fame | 3 | 14% |
| Here Comes the Sun | 3 | 14% |
| Californication | 2 | 9% |
| | 22 | |

Spreadsheets 1-7

| 1. Example Wine Descriptors | |
|---|---|
| Accessible | A wine that is easy to drink without an overwhelming sense of tannin, acidity or extract. |
| Acidic | A wine with a noticeable sense of acidity.[2] |
| Aftertaste | The taste left on the palate after wine has been swallowed. "Finish" is a synonym. |
| Aggressive | A younger wine with harsh and pronounced flavors. The opposite of a wine described as "smooth" or "soft." See robust below. |
| Alcoholic | A wine that has an out of balanced presence of too much alcohol. |
| Aroma | The smell of a wine. The term is generally applied to younger wines, while bouquet is reserved for more aged wines. |
| Astringent | An overly tannic white wine.[3] |
| Axillary | Redolent of an unwashed body; caused by an improper ratio of alcohol to tannins. |
| Austere | A wine that is dominated by harsh acidity or tannin and is lacking the fruit needed to balance those components. |
| Autolytic | Aroma of "yeasty" or acacia-like floweriness commonly associated with wines that have been aged sur lie. |
| Baked | A wine with a high alcohol content that gives the perception of stewed or baked fruit flavors. May indicate a wine from grapes that were exposed to the heat of the sun after harvesting. |
| Balanced | A wine that incorporates all its main components-tannins, acid, sweetness, and alcohol-in a manner where no one single component stands out.[4] |
| Barnyard | Certain off flavors of wine, often caused by the bacteria *brettanomyces*; generally more negative than farmyard |
| Big | A wine with intense flavor, or high in alcohol.[5] |
| Biscuity | A wine descriptor often associated with Pinot noir dominated-Champagne. It is sense of yeasty or bread dough aroma and flavors. |
| Bite | A firm and distinctive perception of tannins or acidity. This can be a positive or negative attribute depending on whether the overall perception of the wine is balanced. |
| Bitter | An unpleasant perception of tannins. |
| Blowzy | An exaggerated fruity aroma. Commonly associated with lower quality fruity wines. |
| Bodacious | Descriptor used liberally by "gonzo" wine critic Ricky Schraub in his pioneering column in the Berkeley Barb during the 1970s to describe Napa and Sonoma wines he really liked. A term of overall critical assessment, not aroma. |
| Body | The sense of alcohol in the wine and the sense of feeling in the mouth.[3] |
| Bouquet | The layers of smells and aromas perceived in a wine.[3] |
| Bright | When describing the visual appearance of the wine, it refers to high clarity, very low levels of suspended solids. When describing fruit flavors, it refers to noticeable acidity and vivid intensity. |
| Buttery | A wine that has gone through malolactic fermentation and has a rich, creamy mouthfeel with flavors reminiscent of butter. |
| Cassis | The French term for the flavors associated with black currant. In wine tasting, the use of cassis over black currant typically denotes a more concentrated, richer flavor. |
| Cat Pee | An aroma often associated with Sauvignon Blanc. Frequently present in Sauvignon Blanc from New Zealand. [6] |
| Cedarwood | The woodsy aroma of a wine that has been treated with oak. |
| Charming | A wine with a range of pleasing properties but nothing that stands out in an obvious fashion. |
| Cheesy | An aroma element characteristic of aged Champagne that develops after an extended period of aging. It is associated with the aroma of aged, nutty cheeses such as gouda and is caused by a small amount of butyric acid that is created during fermentation and later develops into an ester known as ethyl butyrate. |
| Chewy | The sense of tannins that is not overwhelming. It is not necessarily a negative attribute for wine.[3] |
| Chocolaty | The flavors and mouthfeel associated with chocolate, typically among rich red wines such as Cabernet Sauvignon and Pinot noir. |
| Cigar-box | The tobacco aromas derived from oak influence. |
| Citrous | A wine with the aromas and flavor from the citrus family of fruits. |
| Classic | A wine of exceptional quality that displays the typicity of its varietals, displays layers of complexity, and is very well balanced. |
| Clean | A wine that is not demonstrating any obvious faults or unwanted aromas and flavors. |
| Clear | A wine with no visible particulate matter. |
| Clement | A wine that is smooth to drink and easy to swallow. |
| Closed | A wine that is not very aromatic.[3] |
| Cloves | An aroma associated with oak treatment that gives the perception of cloves. It is caused by the creation of eugenol by the toasting of the oak barrels. |
| Cloying | A wine with a sticky or sickly sweet character that is not balanced with acidity. |
| Coarse | A wine with a rough texture or mouthfeel. Usually applies the perception of tannins. |
| Coconut | Aroma perception of coconut derived from treatment in American oak. |
| Compact | Opposite of "open knit". A wine with a dense perception fruit that is balanced by the weight of tannins and acidity. |
| Complete | Similar to the description of a "balanced wine" but more encompassing a wine that all the main components-acidity, alcohol, fruit and tannins-in long along with a pleasing mouthfeel and long finish. |
| Complex | A wine that gives a perception of being multi-layered in terms of flavors and aromas.[7] |
| Concentrated | Intense flavors.[3] |
| Concoction | A wine that seems to have many different components that are thrown together haphazardly, rather than integrating into one cohesive profile. |
| Connected | A sense of the wine's ability to relay its place of origin or terroir[8] |
| Contrapunctual | Marked by a rich harmony of acidic and sweet notes working in tandem. |
| Cooked | Fruit flavors of a wine that seem like they have been cooked, baked or stewed. It may also indicate that grape concentrate was adding to the must during fermentation. See bake above. |

-continued

| 1. Example Wine Descriptors | |
|---|---|
| Corked | A wine that has cork taint |
| Creamy | A warm, creamy mouthfeel. In sparkling wines, the sense of creaminess arises from a combination of the finesse of the mousse and the results of malolactic fermentation. The perception of creaminess is generally picked up at the back of the throat and through the finish of the wine. |
| Crisco-y | Having a buttery, smooth taste and mouthfeel, but with a very slightly bitter aftertaste. |
| Crisp | A pleasing sense of acidity in the wine.[5] |
| Crust | Sediment, generally potassium bitartrate, that adheres to the inside of a wine bottle |
| Definition | A wine that not only is well balanced but also gives a clear expression of its grape variety or place of origin. |
| Delicate | A wine with a range of subtle notes but nothing that stands out in an obvious fashion. See charming above. |
| Depth | A wine with several layers of flavor. An aspect of complexity. |
| Dirty | A wine with off flavors and aromas that most likely resulted from poor hygiene during the fermentation or bottling process |
| Dried up | A wine that has lost some of its freshness or fruitiness due to extended aging. |
| Dry | A wine that is lacking the perception of sweetness.[2] |
| Earthy | This can mean a wine with aromas and flavor reminiscent of earth, such as forest floor or mushrooms. It can also refer to the drying impression felt on the palate caused by high levels of geosmin that occur naturally in grapes. |
| Easy | A wine that is simple and straightforward without much complexity but still enjoyable to drink. See approachable above. |
| Edgy | A wine with a noticeably level of acidity that heightens the flavors on the palate. Maybe synonymous with "nervy" |
| Elegant | A wine that possess finesse with subtle flavors that are in balance. |
| Expansive | A wine that is considered "big" but still accessible. |
| Expressive | A wine with clearly projected aromas and flavors.[9] |
| Extracted | A wine with concentrated flavors, often from extended skin contact, trading a rougher youth for enhanced ageability. |
| Fallen over | A wine that, at a relatively young age, has already gone past its peak (or optimal) drinking period and is rapidly declining in quality is said to have "fallen over". |
| Farmyard | The earthy and vegetal undertones that some Chardonnay and Pinot noir develop after maturing in the bottle. |
| Fat | A wine that is full in body and has a sense of viscosity.[5] A wine with too much fat that is not balanced by acidity is said to be "flabby" or "blowzy" |
| Feminine | Describes a wine that emphasizes delicate flavors, silky textures and subtle aromas rather than strength, weight and intensity of fruit. |
| Finesse | A wine of high quality that is well balanced. |
| Finish | The sense and perception of the wine after swallowing.[5]` |
| Firm | A stronger sense of tannins.[3] |
| Flabby | A lacking sense of acidity.[5] |
| Flat | In relation to sparkling wines, flat refers to a wine that has lost its effervescence. In all other wines the term is used interchangeably with flabby to denote a wine that is lacking acidity, particularly on the finish. |
| Fleshy | A wine with a noticeable perception of fruit and extract. |
| Foxy | The musty odor and flavor of wines made from *Vitis labrusca* grapes native to North America, usually something undesirable.[10] |
| Fresh | A positive perception of acidity.[3] |
| Fruit | The perception of the grape characteristics and sense of body that is unique to the varietal.[3] |
| Full | Wine with heavy weight or body, due to its alcohol content. It can also refer to a wine that is full in flavor and extract |
| Grapey | A wine with the aromas and flavors reminiscent of grape flavoring-such as those associated with grape jelly. The Muscat family of grapes often produce wines that are described as "grapey". |
| Grassy | An herbaceous or vegetal element of a wine-ranging from freshly mown lawn grass to lemon grass flavors. |
| Green | Usually negative, this can apply to a white wine with vegetal notes, or a red wine with bell pepper or herbal notes. Typically used to describe a wine made from unripe fruit.[5] |
| Gutsy | A wine with noticeable body, extract and fruit. |
| Hard | Overly tannic wine.[3] |
| Harsh | Similar to "coarse" but usually used in a more derogatory fashion to denote a wine that has unbalanced tannins and acidity. |
| Heavy | A wine that is very alcoholic with too much sense of body.[5] |
| Herbaceous | The herbal, vegetal aromas and flavors that maybe derived from varietal characteristics or decisions made in the winemaking process-such as harvesting under-ripened grapes or using aggressive extraction techniques for a red wine fermented in stainless steel. |
| Hollow | A wine lacking the sense of fruit.[3] |
| Hot | Overly alcoholic wine.[5] |
| Inky | A wine's dark coloring and opacity. |
| Jammy | A wine that is rich in fruit but maybe lacking in tannins. |
| Lean | The sense of acidity in the wine that lacks a perception of fruit.[3] |
| Leathery | A red wine high in tannins, with a thick and soft taste.[11] |
| Legs | The tracks of liquid that cling to the sides of a glass after the contents have been swirled. Often said to be related to the alcohol or glycerol content of a wine. Also called tears. |
| Lemony | The tangy acidity of a wine with fruit flavors reminiscent of lemons. |
| Lightstruck | A wine that has had long exposure to ultraviolet light causing "wet cardboard" type aroma and flavor. |

1. Example Wine Descriptors

| | |
|---|---|
| Linalool | The characteristic flowery-peach aroma associated with Muscat and Riesling wines. It derived from the chemical compound linalool. |
| Liquorice | The concentrated flavor from rich sweet wines such as those of Monbazillac AOC which are produced by botrytized grapes. |
| Liveliness | A wine with slight carbonation and fresh, bright acidity. |
| Luscious | Similar to "voluptuous" but more commonly associated with sweet wines that have a rich, concentrated mouthfeel. |
| Marsupial | Smooth but ultimately bland mouthfeel found among some mass-produced pouch wines due to high-heat processing. |
| Mature | A wine that has aged to its peak point of quality.[3] |
| Mean | A wine without sufficient fruit to balance the tannins and/or acidity of the wine, making it unbalanced and unpleasant to drink. |
| Meaty | A wine with a rich, full body (and often pronounce tannins and extract) that gives the drinker the impression of being able to "chew" it. |
| Mellow | A wine with a soft texture that is nearing the peak of its maturity. |
| Midpalate | The feel and taste of a wine when held in the mouth. |
| Minerality | A sense of mineral-ness in the wine, flavors of slate, schist, silex, etc. |
| Musky | Can be used in both a positive and negative connotation relating to the earthy musk aroma in the wine. Typically positive in relation to wines from the Muscat grape family. |
| Nervy | A wine with a noticeable amount of acidity but is still balanced with the rest of the wine's components |
| Nose | The aroma, smell or bouquet of a wine. |
| Oaky | A wine with a noticeable perception of the effects of oak. This can include the sense of vanilla, sweet spices like nutmeg, a creamy body and a smoky or toasted flavor.[2] |
| Oily | A generally full bodied wine with a viscous mouthfeel. If the wine is lacking acidity, this term may be used in conjunction with flabby. |
| Old | A wine which has been aged too long. Often, the fruit vanishes, leaving behind overly thin, earthy and oxidized wine. |
| Opulent | A rich tasting wine with a pleasing texture mouthfeel that is well balanced. |
| Oxidized | A wine that has experienced too much exposure to oxidation, considered faulty, and may exhibit sherry-like odors. |
| Oxidative | A wine that has experienced constrained exposure to oxidation over the course of its aging process. The aromas and flavors that develop as a wine oxidatively matures can range from nuttiness, biscuity and butteriness to more spicy notes. |
| Palate | The feel and taste of a wine in the mouth. |
| Peak | The point where a wine is at its most ideal drinking conditions for an individual taster. This is a very subjective determination as for some tasters a wine will be at its peak when the fruit is still fresh and young while for some tasters the peak will arrive when a wine has matured in flavor. |
| Peppery | A wine with the aromas and flavors reminiscent of the fruit from the Piper family of plants such as black peppercorn associated with Syrah and Grenache based wine or the aroma of crushed white pepper associated with Gruner Veltliner. |
| Perfume | A generally positively used to describe an aspect of a wine's aroma or bouquet. |
| Petrolly | A wine containing a high concentration of trimethyldihydronaphthalene, whose scent is evocative of the odour of petrol, kerosene or paraffin. A petrolly character is considered a highly desirable characteristic in mature Rieslings.[12] |
| Plummy | A wine with the juicy, fresh fruit flavors of plum |
| Polished | A wine that is very smooth to drink, with no roughness in texture and mouthfeel. It is also well balanced. |
| Powerful | A wine with a high level of alcohol that is not excessively alcoholic.[3] |
| Prickly | A wine with some slight residual carbonic gas, though not necessarily to the point of the wine being considered a sparkling wine. Some very young white wines (such as Vinho Verde) and dry rosé may be described as "prickly" |
| Racy | A wine with noticeable acidity that is well balanced with the other components of the wine. |
| Radishy | A slightly bitter, slightly spicy taste, reminiscent of a raw radish. |
| Reticent | A wine that is not exhibiting much aroma or bouquet characteristics perhaps due to its youth. It can be described as the sense that a wine is "holding back". |
| Rich | A sense of sweetness in the wine that is not excessively sweet.[3] |
| Robitussiny | A harsh, chemical-like aroma and taste caused by inadequate cleaning of steel vats between harvesting and fermentation. Rare in European and American wines, more common in those from the Southern Hemisphere. |
| Robust | An older, mature wine with harsh and pronounced flavors. See aggressive above. |
| Round | A wine that has a good sense of body that is not overly tannic.[3] |
| Ruminant | A herbaceous or vegetal element moderated by acidity of a bovine or caprine rennet; upsetting to some critics, beloved by others. |
| Sassy | A wine with bold, brash and audacious flavors. |
| Schwaggy | A sloppily prepared vintage whose crush contained too many seeds and stems, resulting in off flavor notes; not uncommon among new amateur winemakers, but almost never encountered in professionally vinted bottles. |
| Sharp | The acidity of a wine though it can refer to the degree of bitterness derived from a wine's tannin. |
| Sherrylike | A non-Sherry wine that exhibits oxidized aromas that may have been caused by excessive amounts of acetaldehyde. |
| Short | A wine with well developed aromas and mouthfeel but has a finish that is little to non-existent due to the fruit quickly disappearing after swallowing. |
| Smokey | A wine exhibiting the aromas and flavors of the various types of smoke, such as tobacco smoke, roasting fire smoke and a toasty smoke derived from oak influences. |

| 1. Example Wine Descriptors | |
|---|---|
| Smooth | A wine with a pleasing texture. Typically refers to a wine with soft tannins.[5] |
| Soft | A wine that is not overly tannic.[3] |
| Sour | A wine with unbalanced, puckery acidity. Often applies to mistreated wines with excessive acetic acid, giving a vinegar-like bite. |
| Soy Sauce | A wine exhibiting the aroma of old Soy Sauce. Aged Bordeaux wines often exhibit such aroma. |
| Spicy | A wine with aromas and flavors reminiscent of various spices such as black pepper and cinnamon. While this can be a characteristic of the grape varietal, many spicy notes are imparted from oak influences. |
| Stalky | A woody, green herbaceous note in a wine. |
| Structure | The solid components of a wine-acidity, sugar, density of fruit flavors and phenolic compounds such as tannins in relation to the overall balance and body of the wine. |
| Supple | A wine that is not overly tannic.[3] |
| Sweet | A wine with a noticeable sense of sugar levels.[2] |
| Tannic | A wine with aggressive tannins.[2] |
| Tar | A wine with aromas and flavors reminiscent of Tar. Barolo wines often exhibit such characteristic. |
| Tart | A wine with high levels of acidity.[3] |
| Texture | The mouthfeel of wine on the palate. |
| Thin | A wine that is lacking body or fruit |
| Tight | A wine with a significant presence of tannins that is restraining the other qualities of the wine, such as fruit and extract, from being more noticeable. A "tight wine" is expected to age well as the tannins soften to reveal these other qualities. |
| Toasty | A sense of the charred or smoky taste from an oaked wine.[2] |
| Transparency | The ability of a wine to clearly portray all unique aspects of its flavor-fruit, floral, and mineral notes. The opposite would be a wine where flavors are diffused and thoroughly integrated.[13] |
| Truculent | Used to describe a wine that is difficult to swallow. |
| Typicity | How much a wine expresses the typical characteristics of the varietal. |
| Undertone | The more subtle nuances, aromas and flavors of wine. |
| Unoaked | Also known as unwooded, refers to wines that have been matured without contact with wood/oak such as in aging barrels. |
| Upfront | A wine with very perceivable characteristics and quality that do not require much thought or effort to discover. |
| Vanilla | An oak induced characteristic aroma reminiscent of vanilla. |
| Vegetal | A wine with aromas and flavor reminiscent of vegetation as oppose to fruit or floral notes. |
| Vivid | A wine with very expressive ripe, fruit flavors. |
| Vituperative | Slightly bitter, in a tannic, mouth-puckering way. |
| Voluptuous | A wine with a full body and rich texture. |
| Warm | A wine with noticeable but balanced alcohol as opposed to a wine with excessive alcohol that maybe described as "hot". It can also refer to a creamy texture derived from oak treatment. |
| Watery | A wine that is excessively "thin" in body and fruit. |
| Yeasty | Often uses synonymously with "biscuity" and can describe a wine with aromas and flavor reminiscent of bread dough or biscuits. |
| Young | Wine that is not matured and usually bottled and sold within a year of its vintage. |
| Zesty | A wine with noticeable acidity and usually citrus notes. |
| Zippy | A wine with noticeable acidity that is balanced with enough fruit structure so as to not taste overly acidic. |

| 2. Example Music Descriptors | |
|---|---|
| Elements of Music are: | |
| Melody | is a succession of notes heard as some sort of unit. It is a single line of tones that moves up, down, or stays the same using steps, skips and repeated tones. |
| Harmony | is the relationship between two or more simultaneous pitches or pitch simultaneities, chord progression affects the key. |
| Rhythm | is the variation of the accentuation of sounds over time. |
| Tone color | or Timbre is the quality of a sound, determined by the fundamental and its spectra: overtones or harmonics and envelope, and varies between voices and types and kinds of musical instruments, which are tools used to produce sound. It includes: tone color and articulation. |
| Form | is the structure of a particular piece, how its parts are put together to make the whole. |
| Tempo | is the speed of communicating an emotion in a particular piece, how fast or slow it's played. |
| Dynamics | is the volume of all parts as a whole and every layer in the structure. |
| 4 Sound Apsects | |
| Pitch | is the perception of the frequency of the sound experienced, and is perceived as how "low" or "high" a sound is, and may be further described as definite pitch or indefinite pitch. It includes: melody, harmony, tonality, tessitura, and tuning or temperament. |
| Tone color | See above |
| Intensity | or dynamics, is how loud or quiet a sound is and includes how stressed a sound is or articulation. |

2. Example Music Descriptors

| | |
|---|---|
| Duration | is the temporal aspect of music; time. It includes: pulse, beat, rhythm, rhythmic density, meter, tempo |
| Sound Aspects may be combined to create secondary aspects | |
| Structure | includes motive, subphrase, phrase, phrase group, period, section, exposition, repetition, variation, development, and other formal units, textural continuity. |
| Texture | is the interaction of temporal and pitch elements. It includes: homophony, polyphony, heterophony, and simultaneity. |
| Style | is defined by how the above elements are used. It is what distinguishes an individual composer or group, period, genre, region, or manner of performance. |
| Aesthetics | is how the music affects you emotionally. For example: an upbeat tune may make you joyful, while a slow violin song may make you feel lonely, cold, and depressed. |

3. Matching Algorithm Example

| Wine Descriptors | | Music Descriptors |
|---|---|---|
| Accessible | | Melody |
| Acidic | | Harmony |
| Aftertaste | | Rhythm |
| Aggressive | | Tone color |
| Alcoholic | | Form |
| Aroma | | Tempo |
| Astringent | | Dynamics |
| Axillary | | Pitch |
| Austere | | Tone color |
| Autolytic | | Intensity |
| Baked | | Duration |
| Balanced | | Structure |
| Barnyard | | Texture |
| Big | | Style |
| Biscuity | Match Analyzer | Aesthetics |
| Bite | | |
| Bitter | | |
| Blowzy | | |
| Bodacious | | |
| Body | | |
| Bouquet | | |
| Bright | | |
| Buttery | | |
| Cassis | | |
| . . . | | |
| Young | | |
| Zesty | | |
| Zippy | | |

4. Selected Wine Descriptors

| Descriptor | Attribute | Value | Definition |
|---|---|---|---|
| Taste Descriptors | | | |
| Depth | Deep/Light | 1-10 | Higher depth refers to a wine that demands more attention, it fills the mouth with a developing flavor, there are subtle layers of flavor that go "deep." |
| Tone | Muted-Sharp | 1-10 | One's ability to recognize different notes or individual flavor in a wine |
| Sweetness | Dry/Sweet | 1-10 | How much sugary or sweet taste can one detect |
| Size | Small-Big | 1-10 | How much presence it takes up one's mouth |
| Acidity | Low-High | 1-10 | Related to pH of wine, basically how much acid can one taste |
| Tannic | Silky-Rough | 1-10 | How much Tannins can one taste. A naturally occurring substance in grapeskins, seeds and stems. Is primarily responsible for the basic "bitter" component in wines. Acts as a natural preservative, helping the development and, in the right proportion, balance of the wine. It is considered a fault when present in excess. |
| | Low-High | 1-10 | |
| Alcohol | Low-High | 1-10 | How much alcohol can one taste |
| Flavor Character | Drop down list | Type of fruit, Herbal, Earthy, Floral, Oaky, Smokey, Spice, meat flavors (e.g. bacon), toasty, etc. | What is the flavor nature of the line. Drop down list is exemplary characters. |

4. Selected Wine Descriptors

| Descriptor | Attribute | Value | Definition |
|---|---|---|---|
| Flavor Intensity | Low-High | 1-10 | How strong is the taste of the wine |
| Structure Descriptors | | | |
| Body | thin/fat | 1-10 | Weight of the wine on the tongue. The effect on the taster's palate usually experienced from a combination of alcohol, glycerin and sugar content. |
| Length | Short-Long | 1-10 | How long the total flavor lasts in the back of the throat after swallowing. Counted in time-seconds. Ten seconds is good, fifteen is great, twenty is superb. Almost a synonym for "finish", as in "this is a wine with an long, extraordinary finish" |
| Balance | Unbalanced (acidic, cloying, flat, or harsh) - Balanced | 1-10 | Denotes harmonious balance of wine elements - (ie: no individual part is dominant). Acid balances the sweetness; fruit balances against oak and tannin content; alcohol is balanced against acidity and flavor. |
| Texture | Drop down list | Creamy, Smooth, Opulent, Rich, Lean, Velvety, Supple, Buttery, Viscous, Fat, Oily, Waxy, Juicy, Silky, Voluptuous and Succulent. | The mouthfeel or sensation of wine on the palate. Drop down list is exemplary textures |
| Composition | | | |
| Oak | Low-High | 1-10 | How much oak flavor is the wine? |
| Fruits | Drop down list | Apples, Berries, Melon, Plums, Blackberry, Blueberry, Strawberry, raspberry, Cherry, Dark Cherry, Pineapple, Apricot, kiwi, starfruit, Grapefruit, Pear, Currents, Lemon | Which fruits are in the wine? |
| Vegetables | Drop down list | Green Bell Pepper, Grass, hay, Asparagus, Dill | Which vegetables are in the wine? |
| Floral | Drop down list | Lavender, Lilac, Rose petal, Mint, *Eucalyptus*, Licorice | Which herbal notes are in the wines |
| Spices | Drop down list | Cinnamon, Cloves, Pepper, Nutmeg Vanilla, Black pepper, White Pepper, Chocolate, Tar | Which spices are in the wine? |
| Minerality | | 1-10 | How much minerality is detected? |

5. Selected Music Descriptors

| Music Descriptor Composition | Attribute | Value | Description |
|---|---|---|---|
| Tonality | Major Scale | 1-10 | Refers to the particular system of relationships between notes, chords, and keys (sets of notes and chords). The sum of relations, melodic and harmonic, existing between the tones of a scale or musical system. In general, musical compositions have higher register parts |

| | 5. Selected Music Descriptors | | |
|---|---|---|---|
| Music Descriptor Composition | Attribute | Value | Description |
| | | | and lower register parts with different instruments playing higher parts and lower parts at the same time. Tonality is essentially an average of all of these higher pitches and lower pitches over the length of the composition or part thereof. |
| Tonality | Minor Scale | 1-10 | |
| Key | Major | C Major<br>C-sharp Major<br>D-flat Major<br>D Major<br>E-flat Major<br>E Major<br>F Major<br>F-sharp Major<br>G-flat Major<br>G Major<br>A-flat Major<br>A Major<br>B-flat Major<br>B Major<br>C-flat Major | |
| Key | Minor | B-flat minor<br>B minor<br>C minor<br>D-flat (C-sharp) minor<br>D minor<br>D-sharp minor<br>E-flat minor<br>E minor<br>F minor<br>F-sharp (G-flat) minor<br>G minor<br>G-sharp minor<br>A-flat minor | |
| Modulation | Dropdown list | Common Chord, Common tone modulation, Chromatic Modulation, Phrase Modulation, Sequential Modulation, Chain Modulation, Parallel Modulation Enharmonic Modulation | most commonly the act or process of changing from one key (tonic, or tonal center) to another |
| Complexity | Less-More | 1-10 | How complex is the musical composition with regards to how many musical instruments are being played simultaneously, how many vocal lines are there simultaneously, how many melodies or countermelodies are there simultaneously, what level of harmony is being heard. |
| Musical Interest | Resolution (Dissonance-Consonance)<br>Suspense | 1-10<br>1-10 | Resolution is the move of a note or chord from dissonance (an unstable sound) to a consonance (a more final or stable sounding one)<br>Suspense is? |
| Masculine/Feminine | Less-More | 1-10 | Gender of a song relates to the mental impression of a composition's gender when a person hears it. Dynamics plays an influence on the gender of a song. Higher pitches would be more feminine while lower pitches would be more masculine. Some instruments have a more masculine or feminine sound. For |

5. Selected Music Descriptors

| Music Descriptor Composition | Attribute | Value | Description |
|---|---|---|---|
| | | | example, a harp would be more feminine, while a trombone would be more masculine. |
| Brightness/darkness | Bright-Dark | 1-10 | A subjective interpretation of a visual correlation of music based on pitch height, pitch distance between subsequent notes, and pitch contour |
| Color | Dropdown list | Color Palette | A subjective association of notes with a particular color |
| Rhythm | Tempo, | 1-10 | Rhythm is the variation of the accentuation of sounds over time. |
| | Rubato | 1-10 | Beat is the unit division of musical time |
| | | | Tempo is the pace of the fundamental beat |
| | | | Rubato varations of the tempo within a musical passage |
| Accent | Dynamic | 1-10 | Accent is the emphasis placed on a note. |
| | Tonic | 1-10 | 1 means less emphasis - 10 is the most emphasis |
| | Agogic | 1-10 | Dynamic accents are notes played louder, Tonic accents are notes played at a higher pitch, and agogic are notes played longer |
| Tempo | Slow-Fast | 1-10 | is the speed of communicating an emotion in a particular piece, how fast or slow it's played. |
| Meter | Dropdown list | Duple, Triple, Compound | the number of syllables in each line and the arrangement of those syllables as long or short, accented or unaccented |
| Dynamics | Dropdown list | 1-10 for each indicating prevalence of each type of dynamic measure | dynamics normally refers to the volume of a sound or note, but can also refer to every aspect of the execution of a given piece, either stylistic (staccato, legato etc.) or functional (velocity) |
| | | | al niente: to nothing; fade to silence. |
| | | | calando: decreasing; becoming smaller |
| | | | calmando: becoming calmer |
| | | | crescendo: becoming louder |
| | | | dal niente: from nothing; out of silence |
| | | | decrescendo or diminuendo: becoming softer |
| | | | fortepiano: loud and then immediately soft |
| | | | fortissimo piano: very loud and then immediately soft |
| | | | in rilievo: indicates that a particular instrument or part is to play louder than the others so as to stand out over the ensemble. |
| | | | perdendo or perdendosi: losing volume, fading into nothing, dying away |
| | | | mezzoforte piano: moderately strong and then immediately soft |
| | | | morendo: dying away (may also indicate a tempo change) |
| | | | marcato: stressed, pronounced |
| | | | pianoforte: soft and then immediately strong |
| | | | sforzando piano: with marked emphasis, then immediately soft |
| | | | sotto voce: in an undertone (whispered or unvoiced)[11] |
| | | | smorzando: becoming muffled or toned down |
| Bass/Treble | Bass/Treble | 1-10 | Does the piece have a more prominent bass or treble sound to it on average? |

| 6. Matching Algorithm Selected | |
|---|---|
| Wine Descriptors | Music |
| Depth | Composition |
| Tone | Major Scale |
| Sweetness | Minor Scale |
| Size | Tonality |
| Acidity | Modulation |
| Tannic | Complexity |
| Alcohol | Musical Interest |
| Flavor Character    Match Analyzer | Masculine/Feminine |
| Flavor Intensity | Brightness/darkness |
| Body | Color |
| Length | Rhythm |
| Balance | Accent |
| Texture | Tempo |
| Oaky | Meter |
| Fruits | Dynamics |
| Vegetables | |
| Floral | |
| Spices | |

| 7. Matching Algorithm Values | | | | |
|---|---|---|---|---|
| Wine Descriptors | Values | Music | Values | Match quality Index |
| Depth | 4 | Major Scale | F Major | 73% |
| Tone | 3 | Minor Scale | G Minor | |
| Sweetness | 6 | Tonality | 8 | |
| Size | 7 | Modulation | Sequential Modulation | |
| Acidity | 8 | Complexity | 6 | |
| Tannic | 2 | Musical Interest | 5, 7 | |
| Alcohol | 2 | Masculine/Feminine | 3 | |
| Flavor Character | Earthy    Match Analyzer | Brightness/darkness | 8 | |
| Flavor Intensity | 7 | Color | Yellow | |
| Body | 5 | Rhythm | 3, 9 | |
| Length | 6 | Accent | 6, 8, 11 | |
| Balance | 8 | Tempo | 6 | |
| Texture | Creamy | Meter | Duple | |
| Oaky | 4 | Dynamics | 5 Calando, 3 piano forte | |
| Fruits | Blueberry | | | |
| Vegetables | N/A | | | |
| Floral | N/A | | | |
| Spices | Mint | | | |

The invention claimed is:

1. A method for improving wine consumption experience comprising:
    accessing a database containing wine profiles and song profiles, wherein each wine profile and song profile include attributes and descriptors having assigned attribute values and descriptor values, wherein the database comprises a tangible computer readable storage medium;
    presenting a user with a wine list containing wines having wine profiles in the accessed database;
    receiving user selections of a wine from the wine list;
    providing a software program stored on tangible computer readable media and a processor configured to execute that software program, the software program comprising instructions to implement a match analyzer configured to analyze wine and song attribute and descriptor values from the wine profiles and song profiles in the database and form wine-song pair database entries by implementing a comparison between wine descriptors and song descriptors in the song and wine profile entries, and selecting entries for potential wine-song pairs that have at least one common descriptor or at least one pair of descriptors previously determined to be related;
    accessing the database and determining, using the match analyzer, one or more wine-song pairs for selected wine; each wine-song pair comprising a matched song and the selected wine from the wine-song pair database entries, wherein each wine-song pair has a match quality index value above the match quality index value of a wine matched to a random song, the match quality index determined based on the number of shared descriptors, attributes and values from the wine profile and song profile entries;
    ranking the determined one or more wine-song pairs based on the number of determined shared descriptors and attributes from the wine profile and song profile entries;
    delivering information on the one or more wine-song pairs to the user; and
    providing the user with an option to play one or more of the songs from the one or more wine-song pairs.

2. The method of claim 1, further comprising:
    receiving selections from the user of one or more wine-song pairs; and
    providing a sound system within listening distance of the user, and playing songs that are part of the selected wine-song pairs.

3. The method of claim 1, wherein the wine list presented to the user as part of a menu.

4. The method of claim 3, wherein the menu is a digital menu presented on an interactive device to the user, and wherein the user makes selections on the interactive device.

5. The method of claim 4, wherein user selections are sent to the software program configured to execute the match analyzer, and wherein the match analyzer returns the ranked wine-song pairs to the user on the interactive device.

6. The method of claim 1, further comprising:
    accessing a database containing wine profiles and song profiles;
    submitting a listing of wines and a listing of music to the database; and
    limiting the match analyzer to analyze wine and song attribute and descriptor values from wine profiles and song profiles in the database that match wines and songs included on submitting listing of wines and listing of music.

7. A system for creating wine-music pairings to create enhanced enjoyment, the system comprising:
    a data server comprising a database comprising wine and song profiles included as database entries, wherein each profile comprises descriptors, attributes, descriptor values and attribute values to characterize a particular song or wine wherein at least some of the values are determined using regression techniques based on analysis of a sample set of values selected for one or more wines or songs, the data server comprising tangible computer readable storage media for storing the database, and a processor;
    a server comprising a tangible computer readable storage media and processor configured to execute a software program stored on the computer readable media, the software program configured to:

access the database, analyze the stored descriptors, attributes, and values for the wine and song profiles in the database, and generate a list of wine-music pairings having a match quality index value above the match quality index value of a wine matched to a random song by implementing a comparison between wine descriptors, attributes, and values and song descriptors, attributes, and values in the song and wine profile entries, the match quality index determined based on the number of shared descriptors, attributes and values from the wine profile and song profile entries;

a user device comprising a user interface and communication interface, wherein the user device is configured to:

presenta user with a list of a plurality of wines or songs having profiles in the database;

receive user selections of one or more wines or songs;

communicate user selections of one or more wines or songs to data server;

receive, from the data server, one or more matched wine-music pairings pairs based on the user selections; and deliver information on the one or more matched wine-music pairings to the user device.

8. The system of claim 7, wherein the user device is a mobile device.

9. The system of claim 7, further comprising a sound system within listening distance of the user.

10. The system of claim 7, wherein the user device is configured to receive user selections of one or more matched wine-song pairings from the user, and to communicate songs corresponding to the one or more matched wine-song pairings to the sound system.

11. The system of claim 7, wherein the user device comprising a digital menu of selectable songs and wines.

12. The system of claim 11, wherein the selectable wines presented on the digital menu include musical descriptors listed for one of the wines.

* * * * *